US012342213B2

(12) United States Patent
Ibrahim et al.

(10) Patent No.: US 12,342,213 B2
(45) Date of Patent: Jun. 24, 2025

(54) UPLINK TRAFFIC THROUGHPUT ENHANCEMENT

(71) Applicant: Apple Inc., Cupertino, CA (US)

(72) Inventors: Rodney G. Ibrahim, Oatlands (AU); ChunLei Lin, Hong Kong (HK); Mohammed Sadique, Auburn (AU); Han Pu, Shanghai (CN); Alosious Pradeep Prabhakar, Singapore (SG); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 17/780,882

(22) PCT Filed: May 28, 2021

(86) PCT No.: PCT/CN2021/096728
§ 371 (c)(1),
(2) Date: May 27, 2022

(87) PCT Pub. No.: WO2022/246796
PCT Pub. Date: Dec. 1, 2022

(65) Prior Publication Data
US 2023/0276291 A1    Aug. 31, 2023

(51) Int. Cl.
*H04W 28/02* (2009.01)
*H04W 76/15* (2018.01)
*H04W 76/19* (2018.01)

(52) U.S. Cl.
CPC ....... *H04W 28/0252* (2013.01); *H04W 76/15* (2018.02); *H04W 76/19* (2018.02)

(58) Field of Classification Search
CPC .. H04W 28/0252; H04W 76/19; H04W 76/15
See application file for complete search history.

(56) References Cited

U.S. PATENT DOCUMENTS

| 2004/0152422 A1* | 8/2004 | Hoglund | H04L 47/70 455/67.11 |
| 2009/0080565 A1* | 3/2009 | Rudolf | H04L 25/03834 375/295 |

(Continued)

FOREIGN PATENT DOCUMENTS

| CN | 102111803 A | * | 6/2011 |
| CN | 104066195 A | | 9/2014 |

(Continued)

OTHER PUBLICATIONS

International Search Report and Written Opinion for PCT/CN2021/096728; 8 pages; Feb. 28, 2022.

(Continued)

*Primary Examiner* — Jael M Ulysse
(74) *Attorney, Agent, or Firm* — Kowert, Hood, Munyon, Rankin & Goetzel, P.C.

(57) ABSTRACT

Apparatuses, systems, and methods for UL traffic throughput enhancements in NSA deployments. A UE may determine that an UL data requirement is substantially greater than a DL data requirement. The UE may perform an UL enhancement procedure based on UL enhancement conditions. The UL enhancement conditions may include determining that a master cell group does or does not operate according to LTE, determining that UL data traffic is only carried via LTE bands or that UL data traffic is split between LTE bands and NR bands, determining that UL carrier aggregation is or is not available, and/or determining that blind secondary cell group addition is supported or is not support by a network. The UE may be configured to perform the at least one UL enhancement procedure thereby enhancing uplink throughput.

20 Claims, 17 Drawing Sheets

(56) References Cited

U.S. PATENT DOCUMENTS

| | | | | |
|---|---|---|---|---|
| 2010/0172329 | A1* | 7/2010 | Yokoyama | H04W 36/304 |
| | | | | 370/332 |
| 2011/0306347 | A1* | 12/2011 | Choi | H04W 36/04 |
| | | | | 455/438 |
| 2012/0188907 | A1* | 7/2012 | Dayal | H04W 72/1215 |
| | | | | 370/254 |
| 2014/0064160 | A1* | 3/2014 | Verger | H04W 52/0216 |
| | | | | 370/329 |
| 2014/0295849 | A1* | 10/2014 | Sirotkin | H04W 36/0022 |
| | | | | 455/437 |
| 2014/0349647 | A1* | 11/2014 | Chen | H04W 36/00837 |
| | | | | 455/436 |
| 2015/0016349 | A1* | 1/2015 | Lai | H04B 7/2643 |
| | | | | 370/329 |
| 2016/0212788 | A1* | 7/2016 | Lee | H04W 48/14 |
| 2016/0294463 | A1* | 10/2016 | He | H04B 7/0697 |
| 2018/0054757 | A1* | 2/2018 | Nanri | H04L 1/00 |
| 2018/0310205 | A1* | 10/2018 | Frenger | H04W 76/19 |
| 2019/0208543 | A1* | 7/2019 | Dhanapal | H04W 72/541 |
| 2019/0349981 | A1* | 11/2019 | Sandberg | H04L 5/0087 |
| 2019/0364476 | A1* | 11/2019 | Chen | H04W 68/02 |
| 2020/0146063 | A1* | 5/2020 | Xu | H04W 24/08 |

FOREIGN PATENT DOCUMENTS

| | | | | |
|---|---|---|---|---|
| CN | 111050360 | A | 4/2020 | |
| EP | 1617606 | A1 | 1/2006 | |
| EP | 3780757 | A1 * | 2/2021 | H04L 65/1016 |

OTHER PUBLICATIONS

Samsung "Summary of email Discussion for Re. 17 enhancements on MIMO for NR"; 3GPP TSG RAN Meeting #86 RP-192435; Sitges, Spain; 31 pages; Dec. 12, 2019.

Extended European Search Report for EP 21942371.2; Dec. 4, 2024.

Lenovo et al. "PDCP packet duplication"; 3GPP TSG-RAN WG2 Meeting #99 R2-1708624; Aug. 21, 2017.

* cited by examiner

| NR Level Index | NR UL Channel Condition Rating | NR PUSCH BLER | NR RLC UL BLER | NR Pathloss (dB) |
|---|---|---|---|---|
| 5 | Very Good | <10% | <0.2% | <90 |
| 4 | Good | <10% | <0.5% | <100 |
| 3 | Average | <15% | <1% | <110 |
| 2 | Bad | <25% | <2% | <120 |
| 1 | Poor | >25% | >2% | >130 |

FIG. 9A

| LTE Level Index | LTE UL Channel Condition Rating | LTE PUSCH BLER | LTE RLC UL BLER | LTE Pathloss (dB) |
|---|---|---|---|---|
| 5 | Very Good | <10% | <0.2% | <90 |
| 4 | Good | <10% | <0.5% | <100 |
| 3 | Average | <15% | <1% | <110 |
| 2 | Bad | <25% | <2% | <120 |
| 1 | Poor | >25% | >2% | >130 |

FIG. 9B

UPLINK TRAFFIC THROUGHPUT ENHANCEMENT

PRIORITY CLAIM

This application is a national phase entry of PCT application number PCT/CN2021/096728, entitled "Uplink Traffic Throughput Enhancement," filed May 28, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for uplink traffic throughput enhancements in non-stand alone deployments, e.g., in 5G NR systems and beyond.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for uplink traffic throughput enhancements in non-stand alone deployments, e.g., in 5G NR systems and beyond.

For example, in some embodiments, a user equipment device (UE) may be configured to determine, e.g., based on monitoring of uplink (UL) and downlink (DL) data requirements, that an UL data requirement is substantially greater than a DL data requirement (e.g., at least two times greater for a duration of at least ten seconds). Additionally, the UE may be configured to determine, e.g., based on one or more UL enhancement conditions, to perform at least one UL enhancement procedure, where the one or more UL enhancement conditions may include any, any combination of, and/or all of (e.g., at least one of and/or one or more of) the UE determining that a master cell group operates according to Long Term Evolution (LTE) or that the master cell group does not operate according to LTE, the UE determining that UL data traffic is only carried via LTE bands or that UL data traffic is split between LTE bands and New Radio (NR) bands, the UE determining that UL carrier aggregation is available or that UL carrier aggregation is not available, and/or the UE determining that blind secondary cell group addition is supported by a network or that blind secondary cell group addition is not supported by the network. Further, the UE may be configured to perform the at least one UL enhancement procedure thereby enhancing uplink throughput.

As another example, a UE may be configured to, when the master cell group operates according to LTE and that UL data traffic is not split between LTE bands and NR bands, determine that uplink carrier aggregation is available, determine that there is not network support for blind secondary cell group addition, artificially fail a current secondary cell group, and use uplink carrier aggregation on the master cell group. Note that determining that UL carrier aggregation is available may include at least one of the UE, advertising an uplink carrier aggregation capability during radio resource control connection setup, triggering a test high uplink centric payload, and/or querying a local cell database. Additionally, artificially failing the current secondary cell group may include at least one of the UE reporting a secondary cell group 0, the UE reporting the secondary cell group failure via layer 3 signaling, and/or the reporting the secondary cell group failure via radio resource control signaling.

As a further example, in some embodiments, a UE may be configured to, when the UE determines that the master cell group operates according to LTE, that UL data traffic is only carried via LTE bands, and that UL carrier aggregation is available or that UL carrier aggregation is not available but that blind secondary cell group addition is supported by the network, the UE may identify alternative bands via a query of a network acquisition database, prioritize alternative bands, e.g., based at least in part, on UL performance, determine that at least one alternative band has better UL performance as compared to the current band, trigger a radio link failure, and re-establish a connection with the network via the at least one alternative band.

As a yet further example, in some embodiments, a UE may be configured to, when the UE determines that the master cell group does not operate according to LTE, determine that UL traffic is carried via the split bearer, compare UL performance for an LTE bearer and an NR bearer, and modify, based on the comparing, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. Additionally, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In addition, the UL data traffic split between the LTE bearer and the NR bearer may be based on the scale factor. For example, when the scale factor is greater than zero, the LTE bearer may be preferred and when the scale factor is zero or less, the NR bearer may be preferred.

As another further example, some embodiments, a UE may be configured to transmit, to a base station, an indication of an expected uplink resource requirement, receive, from the base station and based, at least in part, on the indication of the expected uplink resource requirement, instructions for enhancing uplink throughput, transition to a new band or a new uplink-downlink configuration based on the instructions for enhancing uplink throughput, re-transmit, to the base station, the indication of the expected uplink resource requirement, and receive, from the network, an uplink grant for the new band or the new uplink downlink configuration. The instructions for enhancing uplink throughput may include at least one of handover instructions to move to a new band or a radio resource control (RRC) reconfiguration indicating a new uplink-downlink configuration. The new uplink-downlink configuration may include at least one of additional uplink slots or additional dynamic slots on a New Radio (NR) band as compared to a prior RRC configuration. The uplink grant may be based, at least in part, on the indication of the expected uplink resource requirement. Further, the instructions may include one of a radio resource control reconfiguration message or a handover request message (e.g., based on whether one (handover request message) or multiple UEs (radio resource control reconfiguration message) are transmitting an indication of an expected uplink resource requirement). Additionally, the indication of the expected uplink resource requirement may be transmitted via a medium access control (MAC) control element (CE). The MAC CE may be a BSR_Duration_Timer MAC CE and may include an expected buffer status report (BSR) duration field. In addition, the BSR duration field may be an indication a time period of the BSR. Further, the MAC CE may also include an uplink logical channel group (LCG) index (ID).

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 9A and 9B illustrate an example of tables that may be implemented as part of the tabular comparison, according to some embodiments.

Figure 1A:
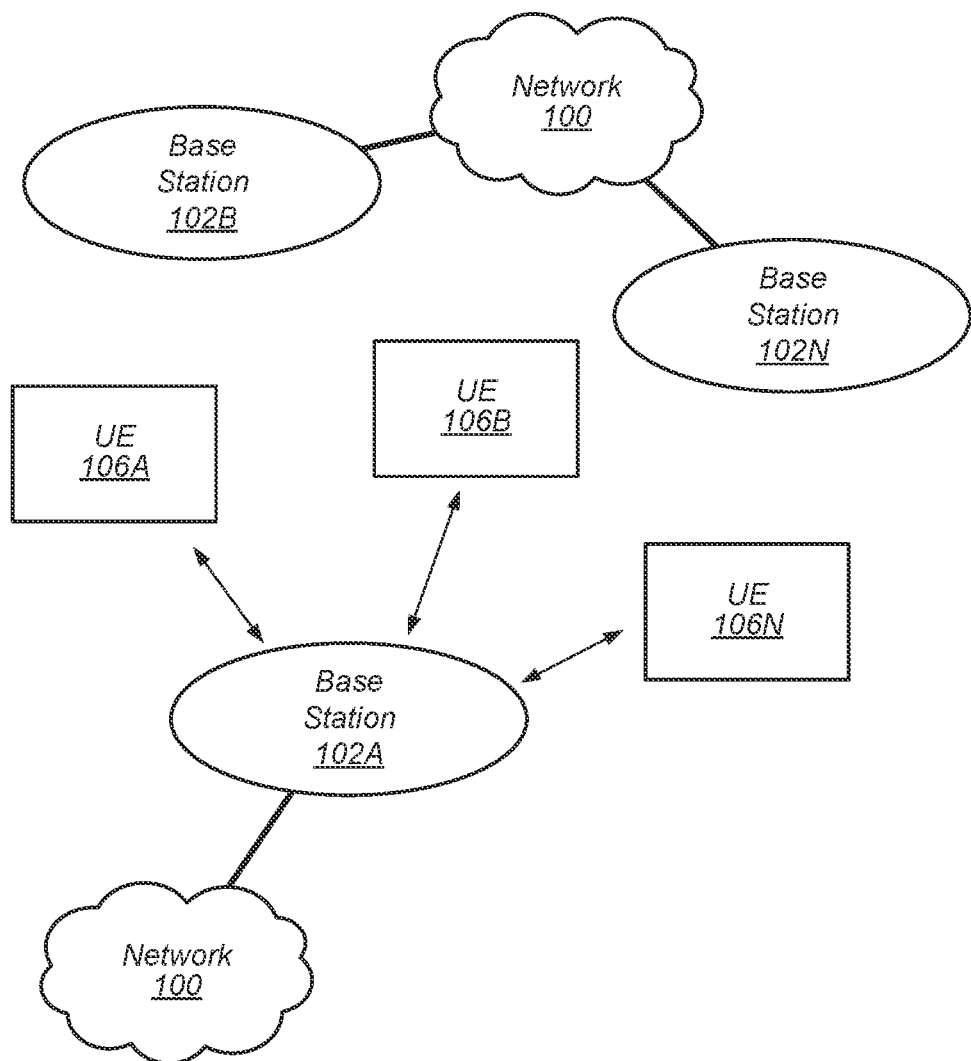
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
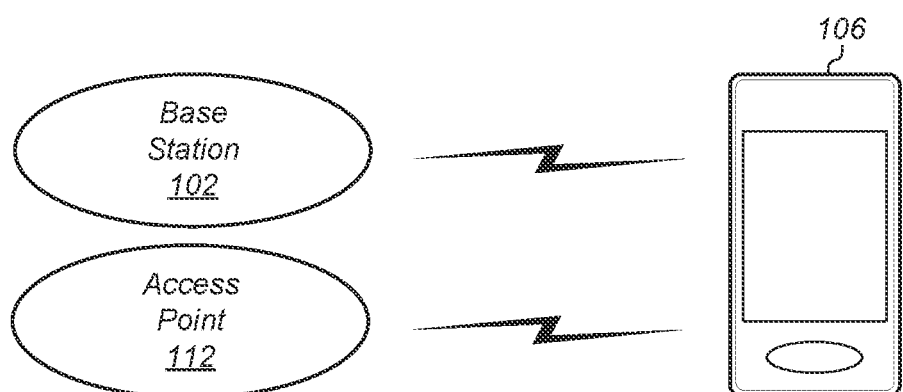
FIG. 1B illustrates an example of a base station and an access point in communication with a user equipment (UE) device, according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
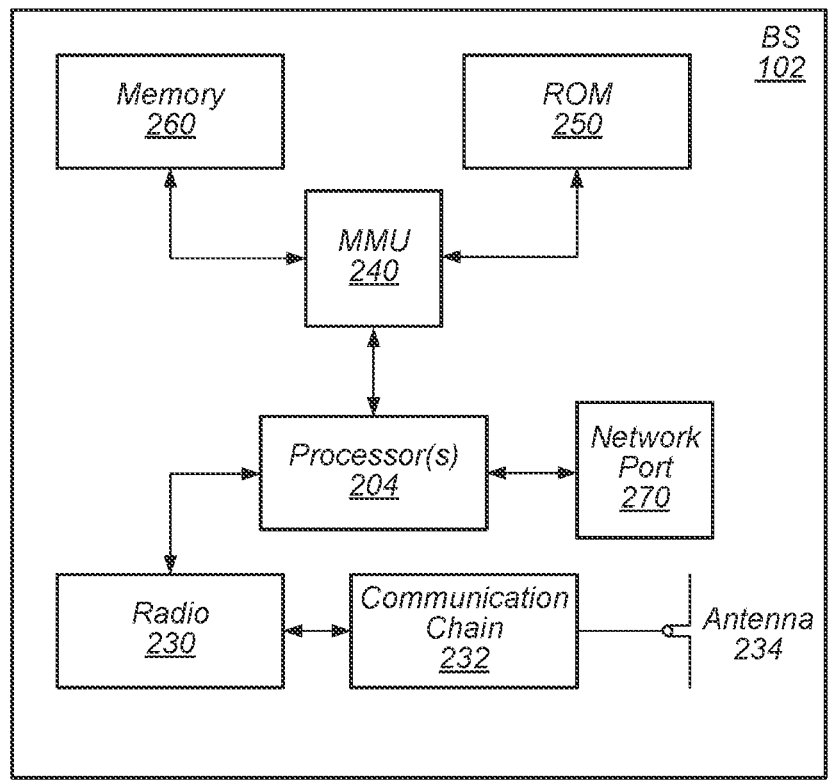
FIG. 2 illustrates an example block diagram of a base station, according to some embodiments.

FIG. 2: Block Diagram of a Base Station

Figure 3:
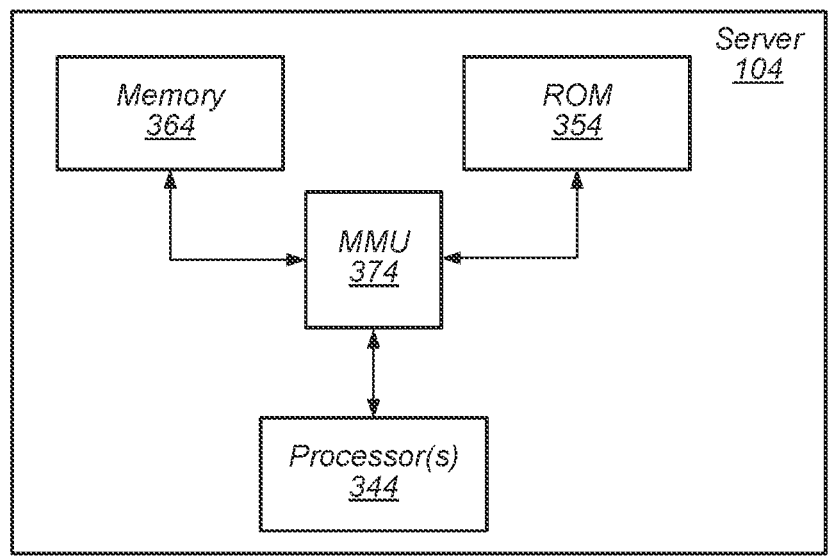
FIG. 3 illustrates an example block diagram of a server according to some embodiments.

FIG. 2 illustrates an example block diagram of a base station 102, according to some embodiments. It is noted that the base station of FIG. 3 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

FIG. 3: Block Diagram of a Server

FIG. 3 illustrates an example block diagram of a server 104, according to some embodiments. It is noted that the server of FIG. 3 is merely one example of a possible server. As shown, the server 104 may include processor(s) 344 which may execute program instructions for the server 104. The processor(s) 344 may also be coupled to memory management unit (MMU) 374, which may be configured to receive addresses from the processor(s) 344 and translate those addresses to locations in memory (e.g., memory 364 and read only memory (ROM) 354) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 344 of the server 104 may be configured to implement or support implementation of part or all of the methods described herein, e.g., by executing program instructions stored on a memory medium (e.g., a non-transitory computer-readable memory medium). Alternatively, the processor 344 may be configured as a programmable hardware element, such as an FPGA (Field Programmable Gate Array), or as an ASIC (Application Specific Integrated Circuit), or a combination thereof. Alternatively (or in addition) the processor 344 of the server 104, in conjunction with one or more of the other components 354, 364, and/or 374 may be configured to implement or support implementation of part or all of the features described herein.

In addition, as described herein, processor(s) 344 may be comprised of one or more processing elements. In other words, one or more processing elements may be included in processor(s) 344. Thus, processor(s) 344 may include one or more integrated circuits (ICs) that are configured to perform the functions of processor(s) 344. In addition, each integrated circuit may include circuitry (e.g., first circuitry, second circuitry, etc.) configured to perform the functions of processor(s) 344.

Figure 4:
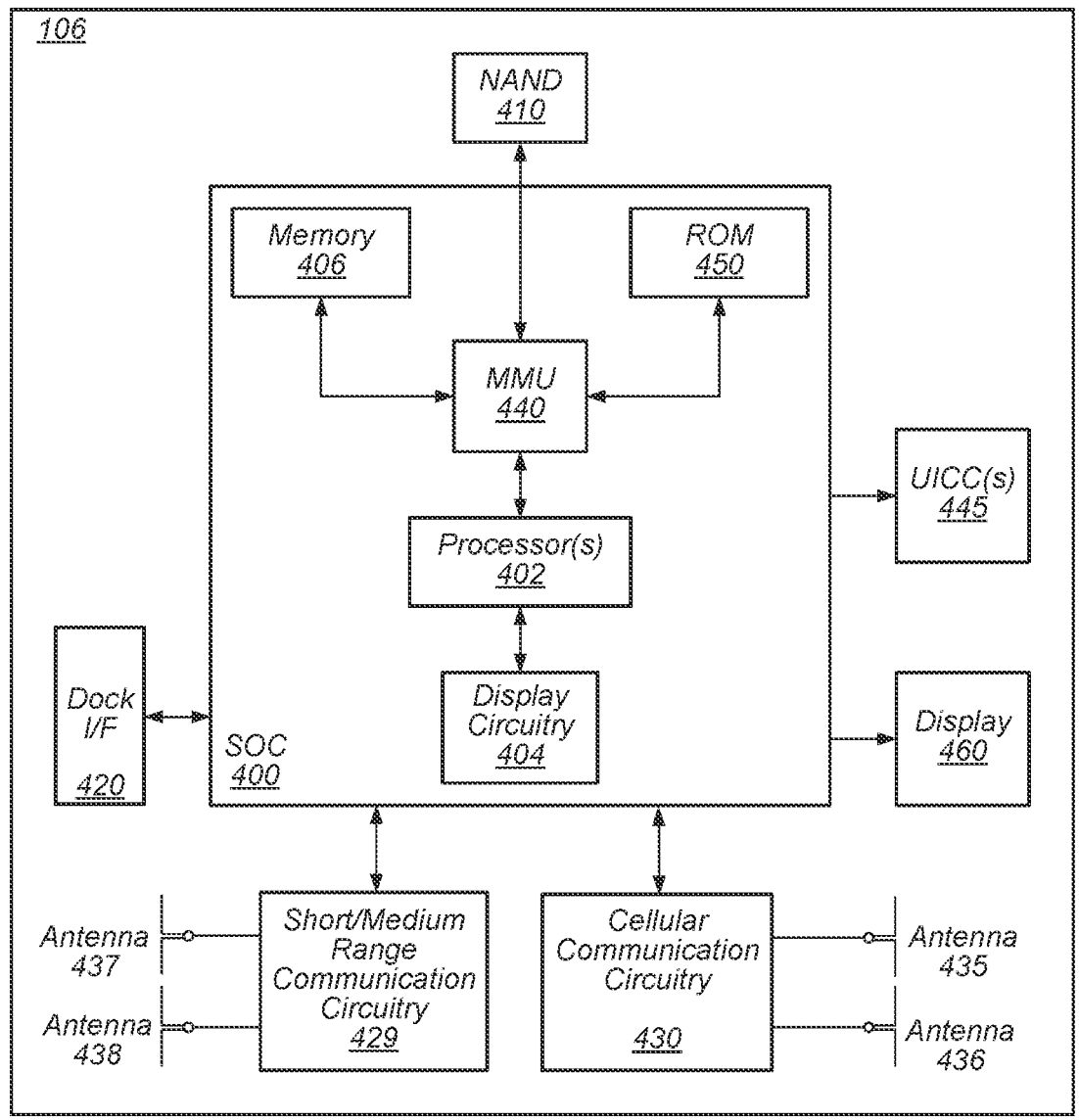
FIG. 4 illustrates an example block diagram of a UE according to some embodiments.

FIG. 4: Block Diagram of a UE

FIG. 4 illustrates an example simplified block diagram of a communication device 106, according to some embodiments. It is noted that the block diagram of the communication device of FIG. 4 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 400 configured to perform core functions. For example, this set of components may be implemented as a system on chip (SOC), which may include portions for various purposes. Alternatively, this set of components 400 may be implemented as separate components or groups of components for the various purposes. The set of components 400 may be coupled (e.g., communicatively; directly or indirectly) to various other circuits of the communication device 106.

For example, the communication device 106 may include various types of memory (e.g., including NAND flash 410), an input/output interface such as connector I/F 420 (e.g., for connecting to a computer system; dock; charging station; input devices, such as a microphone, camera, keyboard; output devices, such as speakers; etc.), the display 460, which may be integrated with or external to the communication device 106, and cellular communication circuitry 430 such as for 5G NR, LTE, GSM, etc., and short to medium range wireless communication circuitry 429 (e.g., Bluetooth™ and WLAN circuitry). In some embodiments, communication device 106 may include wired communication circuitry (not shown), such as a network interface card, e.g., for Ethernet.

The cellular communication circuitry 430 may couple (e.g., communicatively; directly or indirectly) to one or more antennas, such as antennas 435 and 436 as shown. The short to medium range wireless communication circuitry 429 may also couple (e.g., communicatively; directly or indirectly) to one or more antennas, such as antennas 437 and 438 as shown. Alternatively, the short to medium range wireless communication circuitry 429 may couple (e.g., communicatively; directly or indirectly) to the antennas 435 and 436 in addition to, or instead of, coupling (e.g., communicatively; directly or indirectly) to the antennas 437 and 438. The short to medium range wireless communication circuitry 429 and/or cellular communication circuitry 430 may include multiple receive chains and/or multiple transmit chains for receiving and/or transmitting multiple spatial streams, such as in a multiple-input multiple output (MIMO) configuration.

In some embodiments, as further described below, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 430 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 445 that include SIM (Subscriber Identity Module) functionality, such as one or more UICC(s) (Universal Integrated Circuit Card(s)) cards 445. Note that the term "SIM" or "SIM entity" is intended to include any of various types of SIM implementations or SIM functionality, such as the one or more UICC(s) cards 445, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 410 may be implemented as a removable smart card. Thus, the SIM(s) may be one or more removable smart cards (such as UICC cards, which are sometimes referred to as "SIM cards"), and/or the SIMs 410 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 410 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 400 may include processor(s) 402, which may execute program instructions for the communication device 106 and display circuitry 404, which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, short to medium range wireless communication circuitry 429, cellular communication circuitry 430, connector I/F 420, and/or display 460. The MMU 440 may be configured to perform memory protection and page table translation or set up. In some embodiments, the MMU 440 may be included as a portion of the processor(s) 402.

As noted above, the communication device 106 may be configured to communicate using wireless and/or wired communication circuitry. The communication device 106 may be configured to perform methods for revocation and/or modification of user consent in MEC, e.g., in 5G NR systems and beyond, as further described herein.

As described herein, the communication device 106 may include hardware and software components for implementing the above features for a communication device 106 to communicate a scheduling profile for power savings to a network. The processor 402 of the communication device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the communication device 106, in conjunction with one or more of the other components 400, 404, 406, 410, 420, 429, 430, 440, 445, 450, 460 may be configured to implement part or all of the features described herein.

In addition, as described herein, processor 402 may include one or more processing elements. Thus, processor 402 may include one or more integrated circuits (ICs) that are configured to perform the functions of processor 402. In addition, each integrated circuit may include circuitry (e.g., first circuitry, second circuitry, etc.) configured to perform the functions of processor(s) 402.

Further, as described herein, cellular communication circuitry 430 and short to medium range wireless communication circuitry 429 may each include one or more processing elements. In other words, one or more processing elements may be included in cellular communication circuitry 430 and, similarly, one or more processing elements may be included in short to medium range wireless communication circuitry 429. Thus, cellular communication circuitry 430 may include one or more integrated circuits (ICs) that are configured to perform the functions of cellular communication circuitry 430. In addition, each integrated circuit may include circuitry (e.g., first circuitry, second circuitry, etc.) configured to perform the functions of cellular communication circuitry 430. Similarly, the short to medium range wireless communication circuitry 429 may include one or more ICs that are configured to perform the functions of short to medium range wireless communication circuitry 429. In addition, each integrated circuit may include circuitry (e.g., first circuitry, second circuitry, etc.) configured to perform the functions of short to medium range wireless communication circuitry 429.

Figure 5:
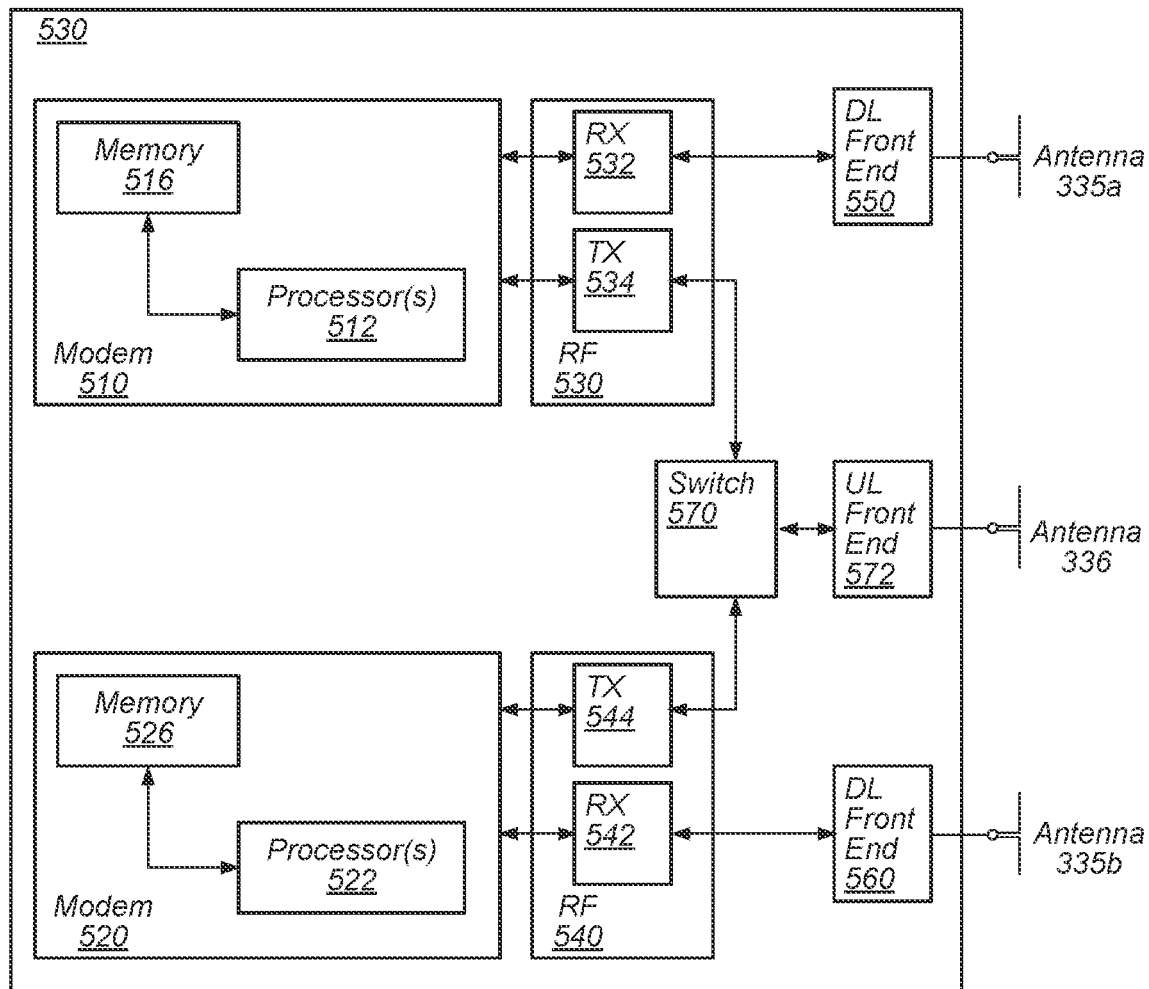
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 530, which may be cellular communication circuitry 430, may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 530 may couple (e.g., communicatively; directly or indirectly) to one or more antennas, such as antennas 435*a-b* and 436 as shown (in FIG. 4). In some embodiments, cellular communication circuitry 530 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 530 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 530 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 530 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 530 may be configured to perform methods for uplink traffic throughput enhancements in non-stand alone deployments, e.g., in 5G NR systems and beyond, as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
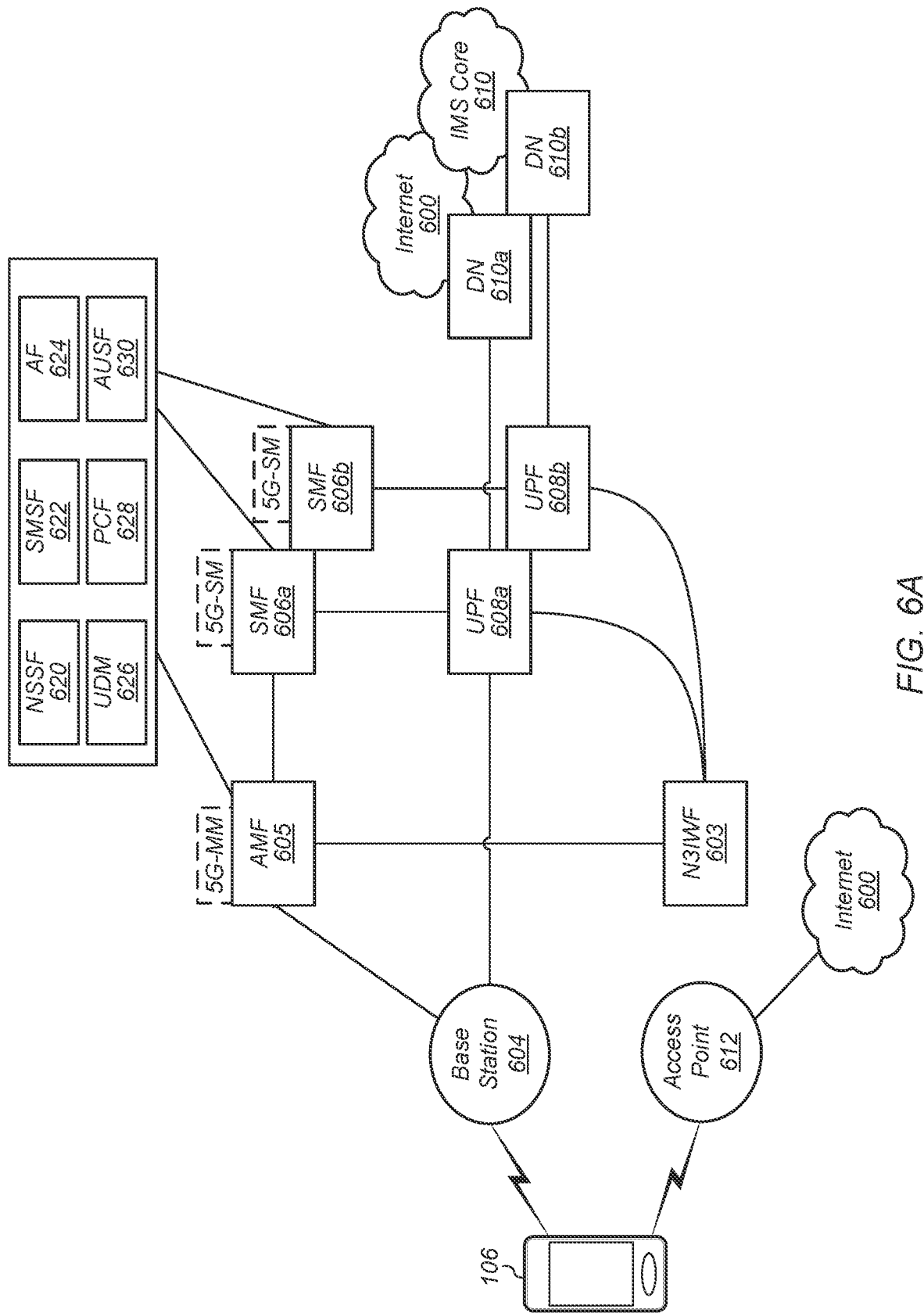
FIG. 6A illustrates an example of a 5G network architecture that incorporates both 3GPP (e.g., cellular) and non-3GPP (e.g., non-cellular) access to the 5G CN, according to some embodiments.
Figure 6B:
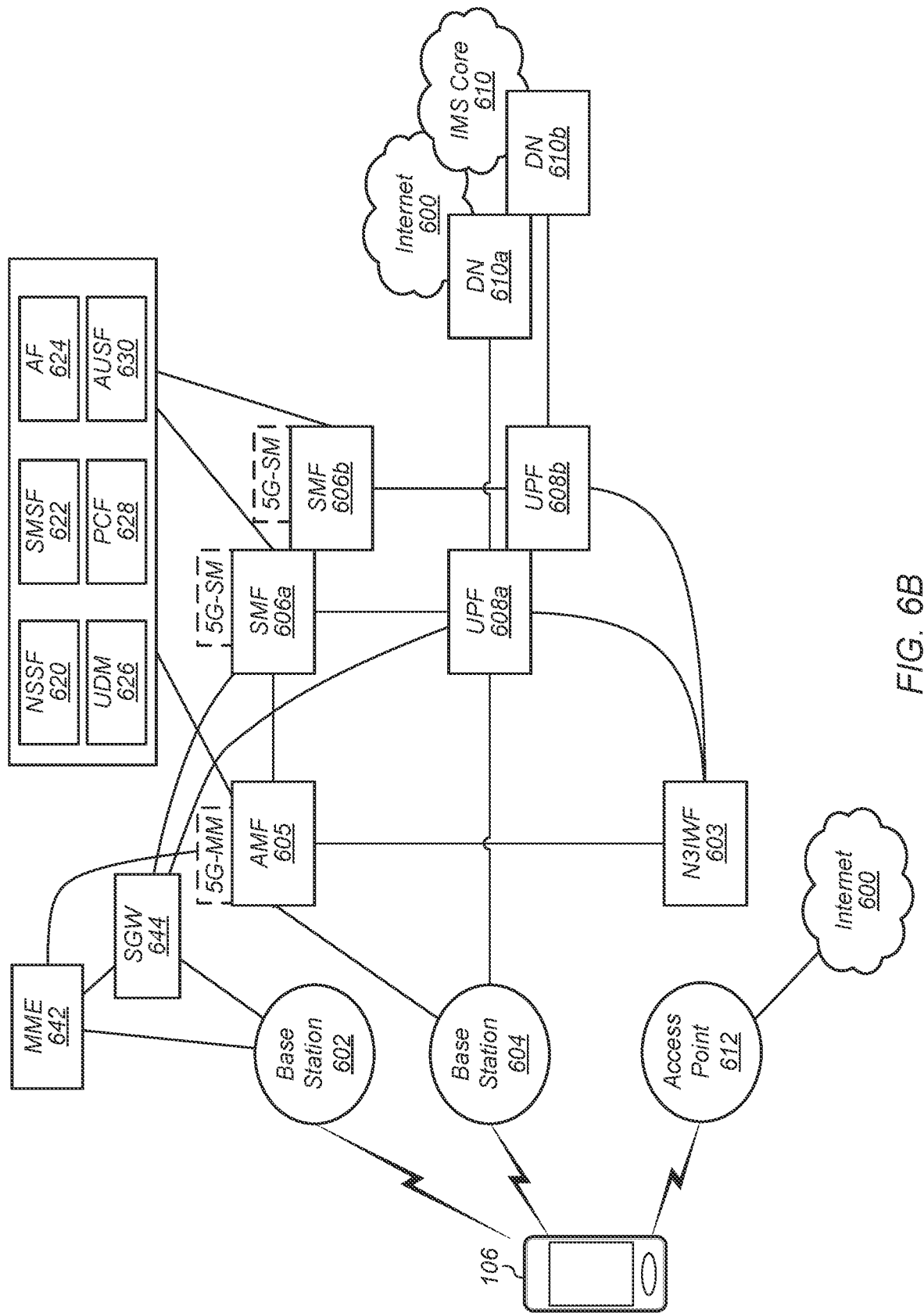
FIG. 6B illustrates an example of a 5G network architecture that incorporates both dual 3GPP (e.g., LTE and 5G NR) access and non-3GPP access to the 5G CN, according to some embodiments.
Figure 7:
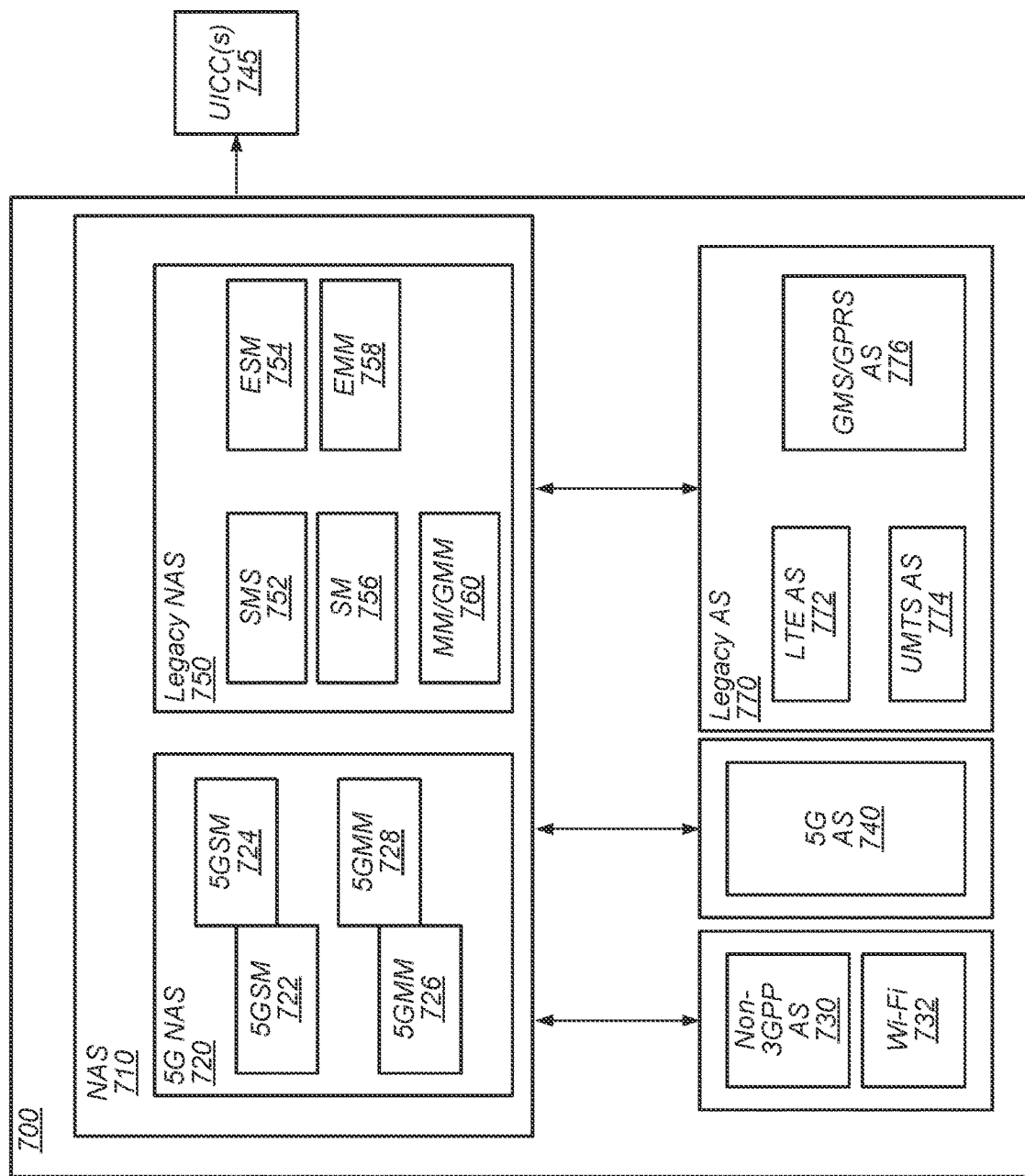
FIG. 7 illustrates an example of a baseband processor architecture for a UE, according to some embodiments.

FIGS. 6A, 6B and 7: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 6A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB 604, which may be a base station 102) and an access point, such as AP 612. The AP 612 may include a connection to the Internet 600 as well as a connection to a non-3GPP inter-working function (N3IWF) 603 network entity. The N3IWF may include a connection to a core access and mobility management function (AMF) 605 of the 5G CN. The AMF 605 may include an instance of a 5G mobility management (5G MM) function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. As shown, the AMF 605 may include one or more functional entities associated with the 5G CN (e.g., network slice selection function (NSSF) 620, short message service function (SMSF) 622, application function (AF) 624, unified data management (UDM) 626, policy control function (PCF) 628, and/or authentication server function (AUSF) 630). Note that these functional entities may also be supported by a session management function (SMF) 606a and an SMF 606b of the 5G CN. The AMF 605 may be connected to (or in communication with) the SMF 606a. Further, the gNB 604 may in communication with (or connected to) a user plane function (UPF) 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and Internet Protocol (IP) Multimedia Subsystem/IP Multimedia Core Network Subsystem (IMS) core network 610.

FIG. 6B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB 604 or eNB 602, which may be a base station 102) and an access point, such as AP 612. The AP 612 may include a connection to the Internet 600 as well as a connection to the N3IWF 603 network entity. The N3IWF may include a connection to the AMF 605 of the 5G CN. The AMF 605 may include an instance of the 5G MM function associated with the UE 106. In addition, the RAN (e.g., gNB 604) may also have a connection to the AMF 605. Thus, the 5G CN may support unified authentication over both connections as well as allow simultaneous registration for UE 106 access via both gNB 604 and AP 612. In addition, the 5G CN may support dual-registration of the UE on both a legacy network (e.g., LTE via eNB 602) and a 5G network (e.g., via gNB 604). As shown, the eNB 602 may have connections to a mobility management entity (MME) 642 and a serving gateway (SGW) 644. The MME 642 may have connections to both the SGW 644 and the AMF 605. In addition, the SGW 644 may have connections to both the SMF 606a and the UPF 608a. As shown, the AMF 605 may include one or more functional entities associated with the 5G CN (e.g., NSSF 620, SMSF 622, AF 624, UDM 626, PCF 628, and/or AUSF 630). Note that UDM 626 may also include a home subscriber server (HSS) function and the PCF may also include a policy and charging rules function (PCRF). Note further that these functional entities may also be supported by the SMF 606a and the SMF 606b of the 5G CN. The AMF 606 may be connected to (or in communication with) the SMF 606a. Further, the gNB 604 may in communication with (or connected to) the UPF 608a that may also be communication with the SMF 606a. Similarly, the N3IWF 603 may be communicating with a UPF 608b that may also be communicating with the SMF 606b. Both UPFs may be communicating with the data network (e.g., DN 610a and 610b) and/or the Internet 600 and IMS core network 610.

Note that in various embodiments, one or more of the above-described network entities may be configured to perform methods to improve security checks in a 5G NR network, including mechanisms for uplink traffic throughput enhancements in non-stand alone deployments, e.g., in 5G NR systems and beyond, e.g., as further described herein.

FIG. 7 illustrates an example of a baseband processor architecture for a UE (e.g., such as UE 106), according to some embodiments. The baseband processor architecture 700 described in FIG. 7 may be implemented on one or more radios (e.g., radios 429 and/or 430 described above) or modems (e.g., modems 510 and/or 520) as described above. As shown, the non-access stratum (NAS) 710 may include a 5G NAS 720 and a legacy NAS 750. The legacy NAS 750 may include a communication connection with a legacy access stratum (AS) 770. The 5G NAS 720 may include communication connections with both a 5G AS 740 and a non-3GPP AS 730 and Wi-Fi AS 732. The 5G NAS 720 may include functional entities associated with both access stratums. Thus, the 5G NAS 720 may include multiple 5G MM entities 726 and 728 and 5G session management (SM) entities 722 and 724. The legacy NAS 750 may include functional entities such as short message service (SMS) entity 752, evolved packet system (EPS) session management (ESM) entity 754, session management (SM) entity 756, EPS mobility management (EMM) entity 758, and mobility management (MM)/GPRS mobility management (GMM) entity 760. In addition, the legacy AS 770 may include functional entities such as LTE AS 772, UMTS AS 774, and/or GSM/GPRS AS 776.

Thus, the baseband processor architecture 700 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above-described functional entities of the 5G NAS and/or 5G AS may be configured to perform methods for uplink traffic throughput enhancements in non-stand alone deployments, e.g., in 5G NR systems and beyond, e.g., as further described herein.

Uplink Traffic Throughput Enhancement

In current implementations, there may be various causes for limited to decreased uplink throughput in a non-stand alone deployment of 5G NR, e.g., such as in an Evolved-Universal Terrestrial Radio Access New Radio Dual Connectivity (EN-DC) deployment of 5G NR. For example, in some implementations, uplink (UL) carrier aggregation configurations in LTE may not be supported when an NR secondary cell group (SCG) is configured. Thus, since UL CA on LTE is not supported when operating in an EN-DC mode, if a network is configured to use LTE only for uplink (e.g., an ul-DataSplitThreshold information element is set to a value of infinity), the network may limit uplink traffic to a single LTE channel for various factors, such as in device co-existence issues as a UE, co-existence issues in the network receiver entity, and/or limitations of UE radio frequency (RF) front end. In some instances, the limiting of uplink traffic to a single LTE channel may cause as much as a 49% decrease in uplink throughput for a UE in EN-DC mode as compared to a UE operating only on LTE. In other words, in some instances, a UE operating in EN-DC mode, e.g., to improve downlink throughput, may suffer a substantial degradation in uplink throughput as compared to a UE operating in LTE only mode. As another example, a network may prioritize LTE bands to be used as anchor bands for EN-DC mode, however, the prioritized LTE bands may not be optimal for uplink performance, e.g., due to pathloss, bandwidth, and so forth. Note that it is often the case that EN-DC networks are configured to use a specific LTE band as the anchor band due to a number of reasons, with one common reason being IOT issues between the LTE and NR vendors. Thus, in these scenarios, the anchor band is necessary for EN-DC (and achieving higher downlink throughput performance) but may negatively impact the UE's uplink performance. As a further example, uplink traffic over EN-DC split bearers may not be optimized to maximize uplink performance. In some instances, the information element 'ul-DataSplitThreshold' may be statically configured to indicate how much uplink traffic goes on LTE and how much uplink traffic goes on NR. Thus, a master cell group (e.g., an LTE cell in EN-DC mode) may define a minimum throughput that will go on LTE and a secondary cell group (e.g., 5G NR cell in EN-DC mode) may receive overflow traffic. Thus, if the LTE uplink channel is poorly and/or improperly configured/chosen and the ul-DataSplitThreshold value is set to favor LTE uplink, then the UE may suffer uplink traffic issues.

Embodiments described herein provide systems, methods, and mechanisms to support uplink traffic throughput enhancements in non-stand alone deployments, including systems, methods, and mechanisms for artificially failing a secondary cell group (SCG) on the UE (e.g., where UL CA is available and all UL traffic is set to LTE), modification of the UL traffic split, e.g., to preference "best" performing cell group, and/or identification and/or prioritization of a "best" band and/or "best" cell group available to a UE, e.g., based on band parameters. In some instances, prior to any of these actions, one or more conditions may need to be satisfied. For example, the one or more conditions may include carrier network configured for UL via LTE, 'blind SCG' is not supported on configured NR band, UL CA is available on serving cell, and/or the UE has a "sizeable" UL data requirement, e.g., such as UL data requirement (x) is greater than two times a downlink (DL) data requirement (y) for a period of time (t). In some embodiments, when some or all of the one or more conditions are met, temporarily removing the NR SCG (e.g., via artificially failing the NR SCG), UE UL performance may benefit from UL CA in LTE. In some embodiments, removing the NR SCG (and/or causing an artificial SCG failure) may achieved through a t310 expiry timer. In some embodiments, a UE may indicate an expected uplink resource requirement with a period which may allow a network to improve uplink scheduling, e.g., at least for the indicated period. In some embodiments, the UE may indicate the expected uplink resource requirement with the period via a medium access control (MAC) control element (CE). In some embodiments, the MAC CE may cause the network to switch the UE from Option 3x to Option 7x.

Figure 8:
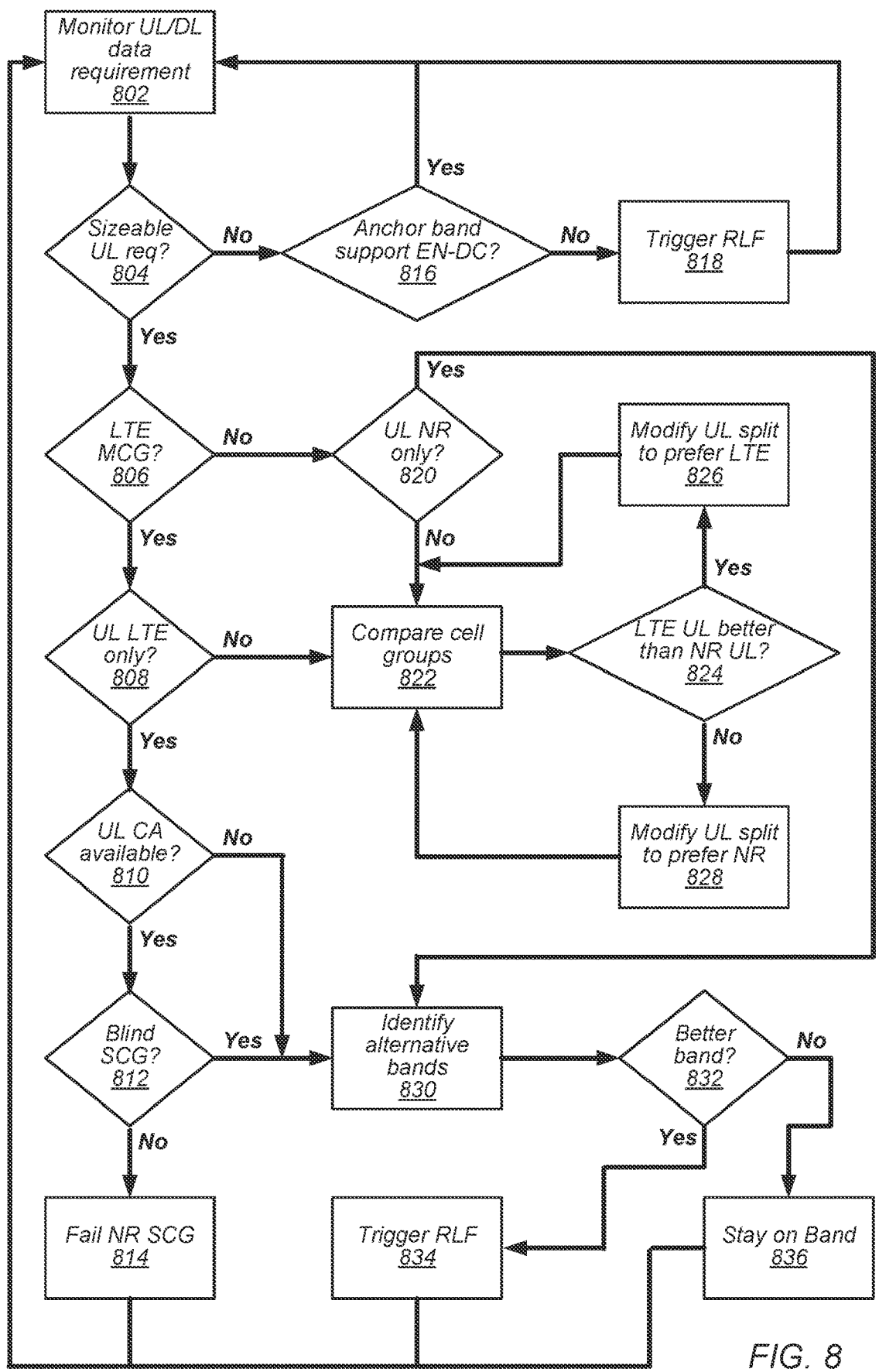
FIG. 8 illustrates an example of a process for a UE to enhance uplink throughput, according to some embodiments.

FIG. 8 illustrates a block diagram of an example of a process for enhancement of uplink throughput, according to some embodiments. The method shown in FIG. 8 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 802, a UE, such as UE 106, may monitor data requirements for uplink data traffic and/or downlink data traffic. Note that the UE may be operating in a dual connectivity mode of operation, e.g., with a master cell group and a secondary cell group. The master cell group may be an LTE cell group. The secondary cell group may be a 5G NR cell group.

At 804, the UE may determine whether there is a sizeable uplink data requirement. For example, the UE may determine whether, for at least a time period, t, the uplink data requirement will be two or more times greater than a downlink data requirement.

At 806, in response to determining that there is a sizeable uplink data requirement, the UE may determine whether the master cell group is operating according to LTE.

At 808, in response to determining that the master cell group is operating according to LTE, the UE may determine whether uplink traffic is carried only on the master cell group, e.g., whether the uplink traffic is LTE only traffic. For example, during an NR secondary cell group (SCG) addition procedure, the UE may check a radio resource control (RRC) reconfiguration log packet to confirm to whether or not the network is configured for LTE only uplink (e.g., whether the uplink traffic is LTE only traffic).

At 810, in response to determining that the uplink traffic is carried only on the master cell group, the UE may determine whether uplink carrier aggregation is available. In some embodiments, the UE may use various techniques to determine whether uplink carrier aggregation is available. For example, the UE may advertise, to the network, an uplink carrier aggregation capability, e.g., during RRC connection setup. As another example, the UE may trigger a "dummy" high uplink centric payload to determine whether the network supports uplink carrier aggregation. Note that in cases in which the network support uplink carrier aggregation, the network may configure the uplink carrier aggregation. In addition, if and/or when the network configures uplink carrier aggregation, the UE may update a local cell database to indicate support of uplink carrier aggregation for the current cell.

At 812, in response to determining that uplink carrier aggregation is available, the UE may determine whether blind secondary cell group addition is used by the network. In other words, the UE may check whether a current serving band/PCI has blind secondary cell group (SCG) configured.

At 814, in response to determining that blind secondary cell group addition is not supported by the network, the UE may artificially fail the secondary cell group, e.g., the 5G NR secondary cell group. The artificial failure may be accomplished by the UE reporting a secondary cell group 0 and/or by the UE reporting a secondary cell group failure via layer 3 or radio resource control signaling. After failure of the secondary cell group, the UE may use uplink carrier aggregation on LTE cells to enhance uplink throughput and the process may return to 802.

At 816, in response to determining that there is not a sizeable uplink data requirement, the UE may determine whether a current anchor band supports dual connectivity, e.g., whether the current anchor band supports EN-DC. The UE may query a network acquisition database, e.g., a crowd sourced data base residing on a server. The server may be a third party serve, e.g., the server may be operated and/or maintained by a manufacturer of the UE.

At 818, in response to determining that the current anchor band does not support dual connectivity, the UE may trigger a radio link failure. After the radio link failure, the UE may establish a connection to a prioritized band, e.g., for enhanced EN-DC performance and the process may return to 802. Alternatively, in response to determining that the current anchor band does support dual connectivity, the UE may take no further action and the process may return to 802.

At 820, in response to determining that the master cell group is not operating according to LTE, the UE may determine whether uplink traffic is carried only on a 5G NR cell.

At 822, in response to determining, e.g., via analysis of an ul-DataSplitThreshold information element, that not all uplink traffic is carried on the 5G NR cell (e.g., the network is using a split bearer for uplink traffic), the UE may compare performance between a first cell group (e.g., cellGroup 0) and a second cell group (e.g., cellGroup 1). For example, the UE may compare channel bandwidth, pathloss, and/or uplink block error rate (BLER). In some instances, the UE may implement a tabular comparison of cell groups that provides a scaled output to determine an uplink traffic split between the cell groups. For example, FIGS. 9A and 9B illustrate an example of tables that may be implemented as part of the tabular comparison, according to some embodiments. As shown in FIGS. 9A and 9B, a UE may determine an index for NR uplink and LTE uplink, e.g., based on a lowest index after mapping PUSCH BLER, RLC BLER, and Pathloss for both LTE uplink and NR uplink. Then, the UE may use the index for NR uplink and the index for LTE uplink to quantify uplink quality into a scaled ranking such that a scaled ranking of greater than 0 indicates LTE uplink quality is better than NR uplink quality and a scaled ranking value of less than 0 may indicate NR uplink quality is better than LTE uplink quality.

At 824, the UE may determine whether uplink throughput for the first cell group (e.g., the LTE cell group) is better than uplink throughput for the second cell group (e.g., the 5G NR cell group), e.g., based, at least in part, on the tabular comparison of cell groups.

At 826, in response to determining that the uplink throughput for the first cell group is better than the uplink throughput for the second cell group, the UE may modify the uplink traffic split to prefer the first cell group, e.g., based, at least in part, on the scaled output of the tabular comparison. The process may then return to the 822.

Alternatively, at 828, in response to determining that the uplink throughput for the second cell group is better than the uplink throughput for the first cell group, the UE may modify the uplink traffic split to prefer the second cell group, e.g., based, at least in part, on the scaled output of the tabular comparison. The process may then return to the 822.

At 830, in response to determining, e.g., via analysis of an ul-DataSplitThreshold information element, that all uplink traffic is carried on the 5G NR cell (e.g., the network is using an NR bearer for uplink traffic) or in response to determining that uplink carrier aggregation is not available or in response to determining that blind secondary cell group addition is supported by the network, the UE may identify alternative bands, e.g., by querying a network acquisition database e.g., a crowd sourced data base residing on a server. The server may be a third party serve, e.g., the server may be operated and/or maintained by a manufacturer of the UE.

At 832, the UE may determine whether there is an alternative band that may support better uplink throughput as compared to a current band.

At 834, in response to determining that there is an alternative band supports better uplink throughput as compared to the current band, the UE may trigger a radio link failure. After the radio link failure, the UE may establish a connection to a prioritized band, e.g., for enhanced EN-DC performance and the process may return to 802.

At 836, in response to determining that there is not an alternative band supports better uplink throughput as compared to the current band, the UE may remain on the current band and the process may return to 802.

Figure 10:
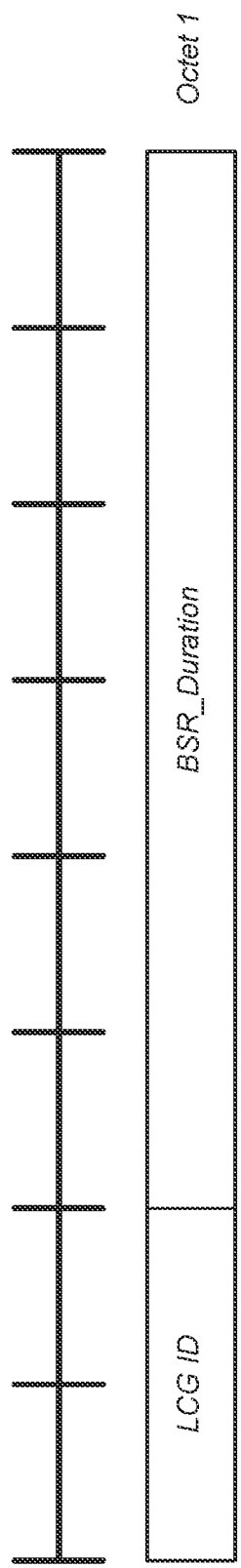
FIG. 10 illustrates an example of a BSR_Duration_Timer MAC CE, according to some embodiments.
Figure 11:
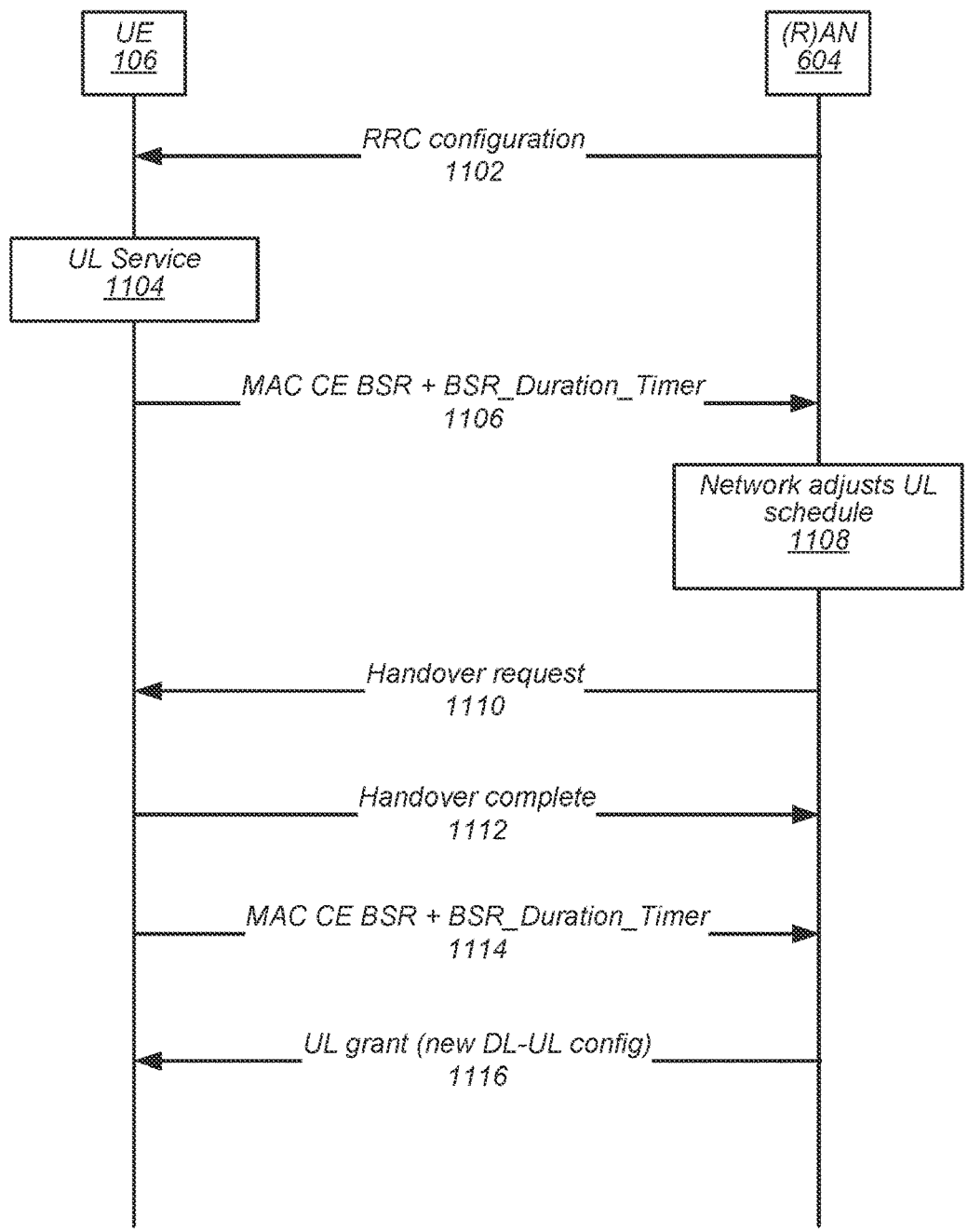
FIG. 11 illustrates an example of signaling for a UE reporting a BSR with a BSR_Duration_Timer MAC CE, according to some embodiments.
Figure 12:
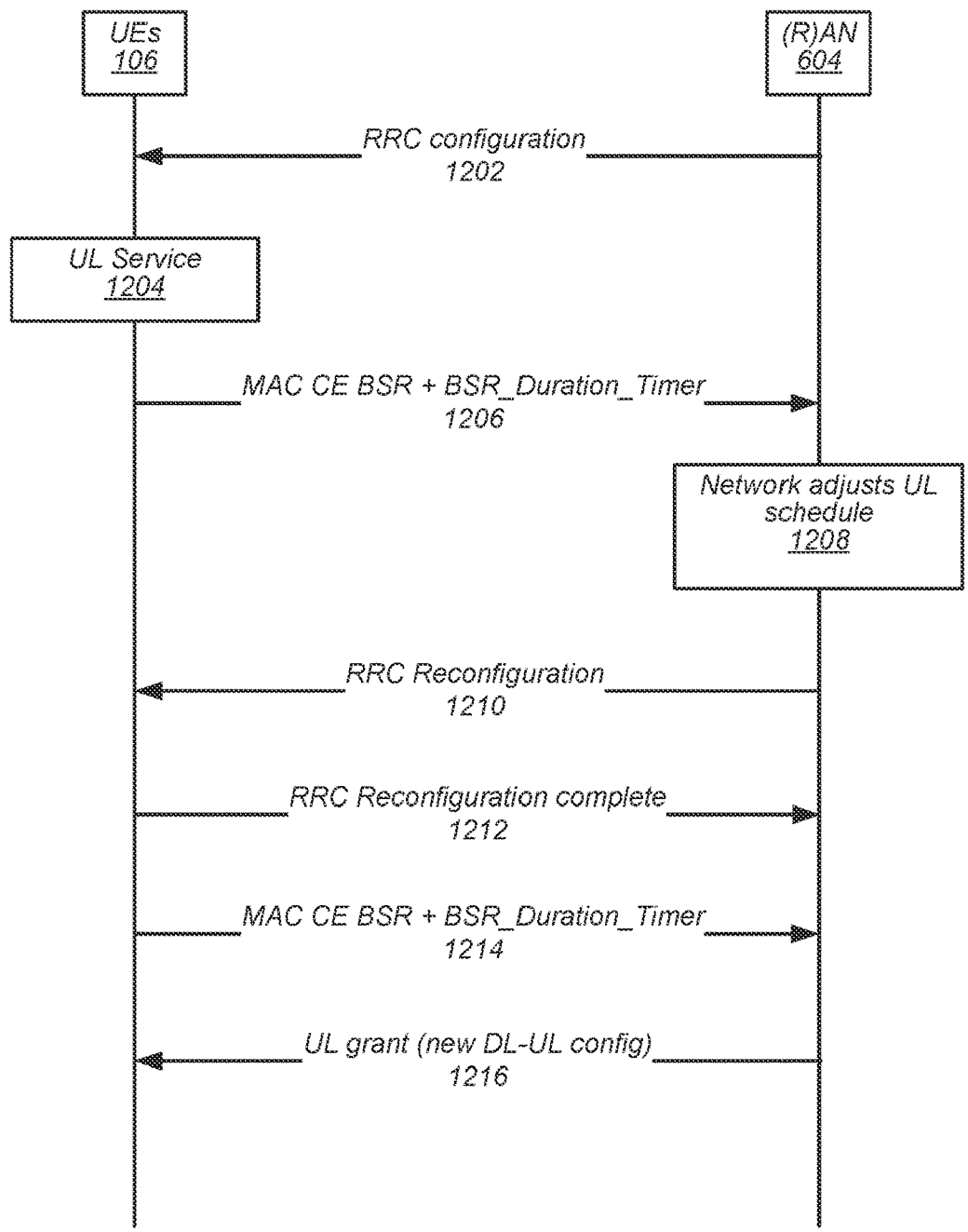
FIG. 12 illustrates an example of signaling for multiple UEs reporting a BSR with a BSR_Duration_Timer MAC CE.

In some embodiments, a UE, such as UE 106, may indicate an expected uplink resource requirement with a period via a MAC CE, e.g., such as the MAC CE illustrated by FIG. 10 which is an example of a BSR_Duration_Timer MAC CE, according to some embodiments. As illustrated by FIG. 10, the BSR_Duration_Timer MAC CE may include 3 bits indicating an uplink logical channel group (LCG) index (ID) and 6 bits indicating an expected BSR duration. Note that a buffer status report (BSR) duration time may be 2 raised to the value of the BSR duration in milliseconds. Note further that when a UE reports a BSR plus the BSR_Duration_Timer, the same BSR value may be expected on every available BSR reporting time resource during the BSR duration. FIGS. 11 and 12 illustrate examples of signaling between a network and UE reporting a BSR_Duration timer, according to some embodiments. In particular, FIG. 11 illustrates an example of a UE reporting a BSR with a BSR_Duration_Timer MAC CE and FIG. 12 illustrates an example of multiple UEs reporting a BSR with a BSR_Duration_Timer MAC CE. The signaling shown in FIGS. 11 and 12 may be used in conjunction with one another as well as any of the systems, methods, or devices shown in the Figures, among other devices. In various embodiments, some of the signaling shown may be performed concurrently, in a different order than shown, or may be omitted. Additional signaling may also be performed as desired.

Turning to FIG. 11, this signaling may flow as follows.

Assuming both a UE, such as UE 106, and a network, e.g., a base station of a network, such as base station 102, both support non-stand alone operation of the UE, the network may send an RRC reconfiguration message 1102 to the UE. The RRC reconfiguration message 1102 may configure the UE for supported bands of the network, e.g., such as LTE-Band 8 and/or NR-Band 1 (e.g., B8_n1).

At 1104, the UE may determine a requirement for uplink service. For example, the UE may determine a sizeable uplink data requirement, e.g., the UE may determine whether, for at least a time period, t, the uplink data requirement will be two or more times greater than a downlink data requirement. Based on the determination, the UE may send a buffer status report (BSR) with a BSR_Duration_Timer MAC CE 1106, e.g., as described herein.

At 1108, the network may adjust (e.g., improve) uplink scheduling for the UE based, at least in part, on the BSR with BSR_Duration_Timer MAC CE. Based on the adjustment, the network may send a handover request 1110 to the UE directing the UE to a new band for improved uplink throughput. For example, the network may direct the UE to handover from B8_n1 to B7 (e.g., B7) for improved uplink throughput based on more available uplink resources on B7. The UE may respond with a handover complete message 1112.

Once the handover is complete, the UE may send a buffer status report (BSR) with a BSR_Duration_Timer MAC CE 1114, e.g., as described herein. Then, in response to receiving the BSR_Duration_Timer MAC CE, the network may send an uplink grant for the new band, e.g., based on the BSR_Duration_Timer MAC CE. Using such a process may allow the UE to provide the network with uplink resource requirements which may indicate to the network to improve uplink scheduling for the UE without impacting performance/scheduling of other UEs.

Turning to FIG. 12, this signaling may flow as follows.

Assuming multiple UEs, such as UEs 106, and a network, e.g., a base station of a network, such as base station 102, serving the multiple UEs each support non-stand alone operation of the UEs, the network may send an RRC reconfiguration message 1202 to the multiple UEs. The RRC reconfiguration message 1202 may configure each of the UEs for supported bands of the network, e.g., such as LTE-Band 8 and/or NR-Band 78 (e.g., B8_n78).

At 1204, each of the UEs may (independently) determine a requirement for uplink service. For example, each of the UEs may determine a sizeable uplink data requirement, e.g., each of the UEs may determine whether, for at least a time period, t, the uplink data requirement will be two or more times greater than a downlink data requirement. Based on the determination, each of the UEs may send a buffer status report (BSR) with a BSR_Duration_Timer MAC CE 1206, e.g., as described herein.

At 1208, the network may adjust (e.g., improve) uplink scheduling for each of the UEs based, at least in part, on the BSR with BSR_Duration_Timer MAC CE. Based on the adjustment, the network may send each of the UEs an RRC reconfiguration message 1210. the RRC reconfiguration message 1210 may include a NR tdd-UL-DL-Configuration-Dedicated information element. In some embodiments, the reconfiguration may add additional uplink slots as compared to the original RRC reconfiguration (e.g., RRC reconfiguration 1202). In some embodiments, the reconfiguration may add more dynamic slots on the NR band in which each UE may determine whether to use the added dynamic slots for uplink or downlink. Then, each of the UEs may respond with an RRC reconfiguration complete message 1212.

Once the RRC reconfiguration is complete, each of the UEs may send a buffer status report (BSR) with a BSR_Duration_Timer MAC CE 1214, e.g., as described herein. Then, in response to receiving the BSR_Duration_Timer MAC CE, the network may send an uplink grant based on the BSR_Duration_Timer MAC CE. Using such a process may allow multiple UEs that prefer higher uplink throughput over higher downlink throughput to improve uplink throughput.

In some embodiments, if and/or when an uplink session continues for more than a predefined period of time (e.g., longer than ten seconds) and if and/or when a UE, such as UE 106, could find availability of LTE neighbor inter-frequency cells with higher bandwidth as compared to a current LTE cell, and if and/or when a reference signal received power (RSRP) of an LTE neighbor inter-frequency cell is greater than a threshold (e.g., such as −100 dBm), then the UE may trigger a secondary cell failure to release an NR cell (e.g., via an SCGFailureInformation IE). Then, the UE may disable NR temporarily, e.g., for a configured period of time, such as until an uplink transfer is complete. Further, once NR is disabled, the UE may trigger a radio link failure (RLF) in LTE and send, to the network, an RRC re-establishment request to the LTE neighbor inter-frequency cell with a higher bandwidth than the current LTE cell. Once the request is complete, the UE may continue the uplink transfer. Then, upon completion of the uplink transfer, the UE may re-enable NR.

In some embodiments, a core network may be a 5G core (5GC) instead of an evolved packet core (EPC), which may introduce an advanced network configuration, such as Option 7x. Note that in Option 7x, a UE, such as UE 106, may have NR as a master cell group and LTE as a secondary cell group. In other words, the UE may camp on an NR cell and add an LTE cell as a secondary leg for data and/or voice service. In such an instance, there may be pockets of no NR coverage in certain locations, e.g., due to network deployment. In these locations, the UE may camp on an LTE cell as a master cell group. Then, when the UE initiates any uplink/downlink data session, the UE will be in an LTE RRC-Connected state. Further, when the UE moves back into an NR coverage area, NR will be added as secondary cell group making the UE connected in an Option 3x configuration. However, Option 3X configuration may disadvantage the UE with lower data throughput in downlink and uplink as compared to Option 7x. In addition, the lower data throughput may result in higher power utilization, e.g., due to prolonged data sessions (e.g., a 1 GB file upload may take over 15 minutes in Option 3x (LTE+NR) as compared to about 1 minute in Option 7x (NR+LTE). Thus, in some embodiments, to avoid this issue, the UE may inform the network via a BSR_Duration_Timer MAC CE of an uplink service requirement. Further, based on the BSR_Duration_Timer MAC CE, the network may trigger the UE to switch from Option 3x configuration to Option 7x configuration. In some instances, the UE may use Option 2 configuration as an intermediate switch between Option 3x configuration and Option 7x configuration. In other words, the UE may transition from Option 3x configuration to Option 2 configuration and then from Option 2 configuration to Option 7x configuration.

FIGS. 13, 14, 15, 16, and 17 illustrate block diagrams of examples of methods for enhancing uplink throughput, according to some embodiments. The methods shown in FIGS. 13, 14, 15, 16, and 17 may be used in conjunction with one another as well as with any of the systems, methods, or devices shown in the Figures, among other devices. In various embodiments, some of the method elements shown may be performed concurrently, in a different order than shown, or may be omitted. Additional method elements may also be performed as desired. As shown, these methods may operate as follows.

Figure 13:
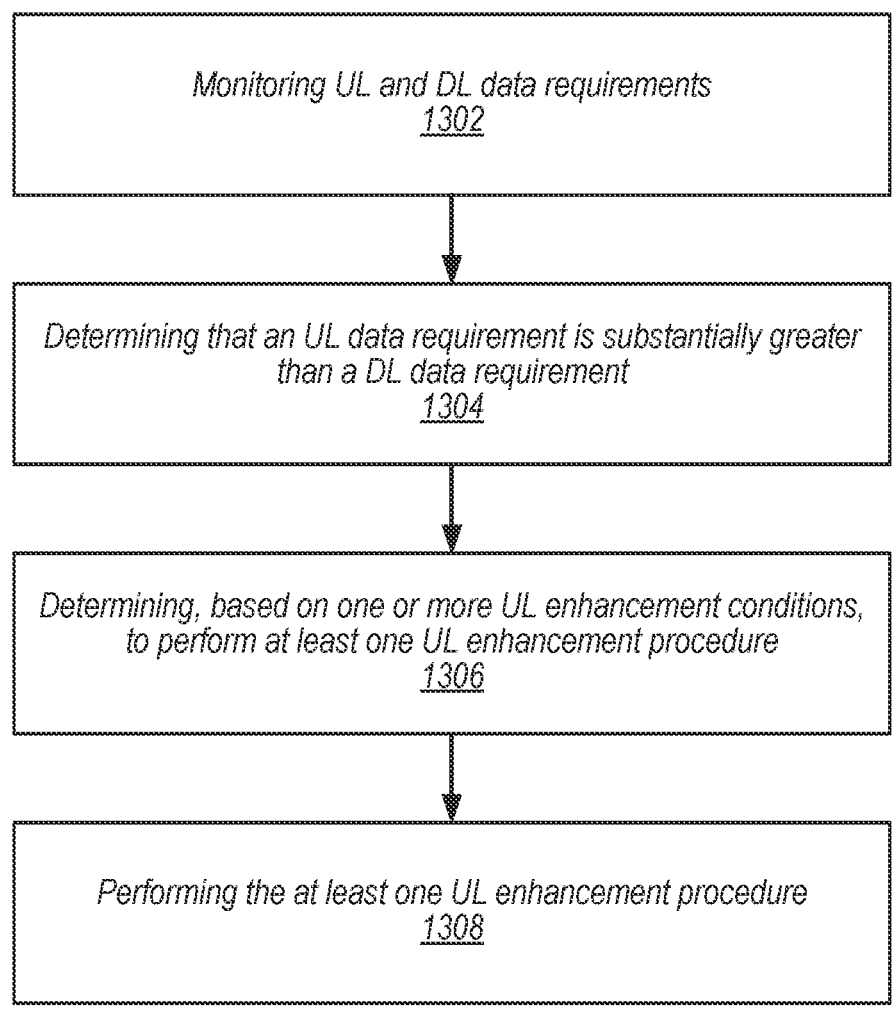
FIGS. 13, 14, 15, 16, and 17 illustrate examples of methods for enhancing uplink throughput, according to some embodiments.

Turning to FIG. 13, at 1302, a UE, such as UE 106, may monitor uplink (UL) and downlink (DL) data requirements. In other words, the UE may monitor UL data requirements as compared to DL data requirements.

At 1304, the UE may determine, e.g., based on the monitoring, that an UL data requirement is substantially greater than a DL data requirement. In some instances, to determine that the UL data requirement is substantially greater that the DL data requirement, the UE may determine that, for a time period, the UL data requirement is greater than downlink data requirement by a predefined factor. In some embodiments, the time period may be at least ten seconds. In other embodiments, the time period may be another value, e.g., such as at least five seconds, at least twenty seconds, and/or some other value. In some embodiments, the predefined factor may be at least two. In other embodiments, the predefined factor may be at least one and a half (1.5) and/or some other value.

At 1306, the UE may determine, e.g., based on one or more UL enhancement conditions, to perform at least one UL enhancement procedure. In some embodiments, the one or more UL enhancement conditions may include any, any combination of, and/or all of (e.g., at least one of and/or one or more of) the UE determining that a master cell group operates according to Long Term Evolution (LTE) or that the master cell group does not operate according to LTE, the UE determining that UL data traffic is only carried via LTE bands or that UL data traffic is split between LTE bands and New Radio (NR) bands, the UE determining that UL carrier aggregation is available or that UL carrier aggregation is not available, and/or the UE determining that blind secondary cell group addition is supported by a network or that blind secondary cell group addition is not supported by the network.

At 1308, the UE may perform the at least one UL enhancement procedure thereby enhancing uplink throughput.

In some embodiments, the UE may transmit, to a base station, an indication of an expected uplink resource requirement, receive, from the base station and based, at least in part, on the indication of the expected uplink resource requirement, instructions for enhancing uplink throughput, transition to a new band or a new uplink-downlink configuration based on the instructions for enhancing uplink throughput, re-transmit, to the base station, the indication of the expected uplink resource requirement, and receive, from the network, an uplink grant for the new band or the new uplink downlink configuration. The instructions for enhancing uplink throughput may include at least one of handover instructions to move to a new band or a radio resource control (RRC) reconfiguration indicating a new uplink-downlink configuration. Note that the new uplink-downlink configuration may include at least one of additional uplink slots or additional dynamic slots on a New Radio (NR) band as compared to a prior RRC configuration. Further, the uplink grant may be based, at least in part, on the indication of the expected uplink resource requirement. In some embodiments, the instructions may include one of a radio resource control reconfiguration message or a handover request message. Note that in some embodiments, the UE may receive the handover instructions when the UE is the only UE transmitting the BSR_Duration_Timer MACE CE to the base station. In addition, note that in some embodiments, the UE may receive the RRC reconfiguration message when the UE is one of multiple UEs transmitting the BSR_Duration_Timer MACE CE to the base station. In some embodiments, the indication of the expected uplink resource requirement may be transmitted via a medium access control (MAC) control element (CE). In some embodiments, the MAC CE may be a BSR_Duration_Timer MAC CE. In some embodiments, the MAC CE may include an expected buffer status report (BSR) duration field. In addition, the BSR duration field may be an indication a time period of the BSR. Further, the MAC CE may also include an uplink logical channel group (LCG) index (ID).

In some embodiments, when the one or more conditions include the UE determining that the master cell group does not operate according to LTE, the at least one UL enhancement procedure may include the UE determining that UL traffic is carried via the split bearer, the UE comparing UL performance for an LTE bearer and an NR bearer, and the UE modifying, based on the comparing, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred. Additionally, in some embodiments, when the UE determines that UL traffic is not carried via the split bearer, the UE may identify alternative bands via a query of a network acquisition database, prioritize the alternative bands e.g., based at least in part, on UL performance, determine that at least one alternative band has better UL performance as compared to the current band, trigger a radio link failure, and re-establish a connection with the network via the at least one alternative band.

In some embodiments, when the one or more conditions include the UE determining that the master cell group operates according to LTE and that UL data traffic is not split between LTE bands and NR bands, the at least one UL enhancement procedure may include the UE determining that uplink carrier aggregation is available, determining that there is not network support for blind secondary cell group addition, artificially failing a current secondary cell group, and using uplink carrier aggregation on the master cell group. In some embodiments, determining that UL carrier aggregation is available may include at least one of the UE, advertising an uplink carrier aggregation capability during radio resource control connection setup, triggering a test high uplink centric payload, and/or querying a local cell database. In some embodiments, artificially failing the current secondary cell group may include at least one of the UE reporting a secondary cell group 0, the UE reporting the secondary cell group failure via layer 3 signaling, and/or the reporting the secondary cell group failure via radio resource control signaling. Further, in some embodiments, when the one or more conditions include the UE determining that the master cell group operates according to LTE and that UL data traffic is split between LTE bands and NR bands, the at least one UL enhancement procedure may include the UE comparing UL performance for an LTE bearer and an NR bearer and modifying, based on the comparing, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred.

In some embodiments, when the one or more UL enhancement conditions include the UE determining that the master cell group operates according to LTE, determining that UL data traffic is only carried via LTE bands, and determining that UL carrier aggregation is available or determining that UL carrier aggregation is not available but that blind secondary cell group addition is supported by the network, the at least one UL enhancement procedure may include the UE identifying alternative bands via a query of a network acquisition database, prioritizing alternative bands, e.g., based at least in part, on UL performance, determining that at least one alternative band has better UL performance as compared to the current band, triggering a radio link failure, and re-establishing a connection with the network via the at least one alternative band.

In some embodiments, the UE may determine, e.g., based on the monitoring, that the UL data requirement is not substantially greater than the DL data requirement. In such instances, the UE may determine whether an anchor band of a network supports dual connectivity. Then, in response to determining that the anchor band does not support dual connectivity, the UE may trigger a radio link failure. After the radio link failure, the UE may re-establish a connection with the network via a band that supports dual connectivity. In some embodiments, to determine whether an anchor band of a network supports dual connectivity, the UE may UE query a network acquisition database to determine the anchor band's dual connectivity capability. In some embodiments, the network acquisition database may be crowd-sourced.

In some embodiments, the UE may query the network acquisition database to determine bands that support dual connectivity based, at least in part, on a location of the UE. Further, the UE may prioritize bands that support dual connectivity, e.g., based, at least in part, on the location of the UE. Then the UE may select the band based on the prioritizing.

Figure 14:
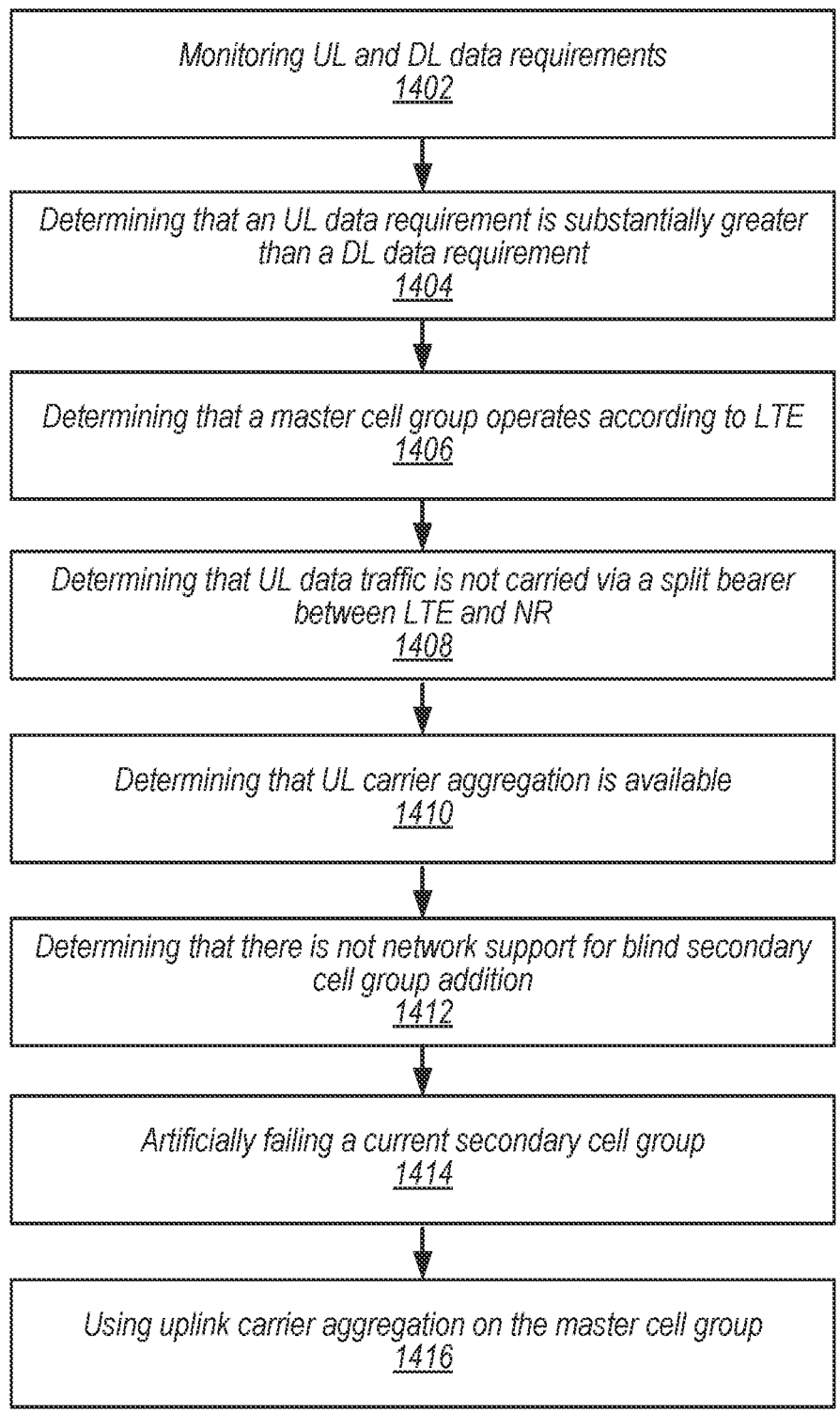

Turning to FIG. 14, at 1402, a UE, such as UE 106, may monitor uplink (UL) and downlink (DL) data requirements. In other words, the UE may monitor UL data requirements as compared to DL data requirements.

At 1404, the UE may determine, e.g., based on the monitoring, that an UL data requirement is substantially greater than a DL data requirement. In some instances, to determine that the UL data requirement is substantially greater that the DL data requirement, the UE may determine that, for a time period, the UL data requirement is greater than downlink data requirement by a predefined factor. In some embodiments, the time period may be at least ten seconds. In other embodiments, the time period may be another value, e.g., such as at least five seconds, at least twenty seconds, and/or some other value. In some embodiments, the predefined factor may be at least two. In other embodiments, the predefined factor may be at least one and a half (1.5) and/or some other value.

At 1406, the UE may determine that a master cell group operates according to LTE. In some embodiments, the UE may check radio resource control parameters. For example, the UE may check a radio resource control reconfiguration message during a secondary cell group addition procedure for a primaryPath and/or a cellGroup parameter to determine that the master cell group operates according to LTE.

At 1408, the UE may determine that UL data traffic is not carried via a split bearer between LTE and NR. For example, the UE may check a value of an ul-DataSplitThreshold parameter to determine that the UL data traffic is not carried via a split bearer between LTE and NR.

At 1410, the UE may determine that UL carrier aggregation is available. In some embodiments, determining that UL carrier aggregation is available may include at least one of the UE, advertising an uplink carrier aggregation capability during radio resource control connection setup, triggering a test high uplink centric payload, and/or querying a local cell database.

At 1412, the UE may determine that there is not network support for blind secondary cell group addition.

At 1414, the UE may artificially fail a current secondary cell group. In some embodiments, artificially failing the current secondary cell group may include at least one of the UE reporting a secondary cell group 0, the UE reporting the secondary cell group failure via layer 3 signaling, and/or the reporting the secondary cell group failure via radio resource control signaling.

At 1416, the UE may use carrier aggregation on the master cell group.

In some embodiments, when the UE determines that the master cell group operates according to LTE and that UL data traffic is split between LTE bands and NR bands, the UE may compare UL performance for an LTE bearer and an NR bearer and modify, based on the comparison, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, the comparison of UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred.

In some embodiments, when the UE determines that the master cell group operates according to LTE, that UL data traffic is only carried via LTE bands, and that UL carrier aggregation is available or that UL carrier aggregation is not available but that blind secondary cell group addition is supported by the network, the UE may identify alternative bands via a query of a network acquisition database, prioritize alternative bands, e.g., based at least in part, on UL performance, determine that at least one alternative band has better UL performance as compared to the current band, trigger a radio link failure, and re-establish a connection with the network via the at least one alternative band.

In some embodiments, when the UE determines that the master cell group does not operate according to LTE, the UE may determine that UL traffic is carried via the split bearer, compare UL performance for an LTE bearer and an NR bearer, and modify, based on the comparing, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred. Additionally, in some embodiments, when the UE determines that UL traffic is not carried via the split bearer, the UE may identify alternative bands via a query of a network acquisition database, prioritize the alternative bands e.g., based at least in part, on UL performance, determine that at least one alternative band has better UL performance as compared to the current band, trigger a radio link failure, and re-establish a connection with the network via the at least one alternative band.

In some embodiments, the UE may transmit, to a base station, an indication of an expected uplink resource requirement, receive, from the base station and based, at least in part, on the indication of the expected uplink resource requirement, instructions for enhancing uplink throughput, transition to a new band or a new uplink-downlink configuration based on the instructions for enhancing uplink throughput, re-transmit, to the base station, the indication of the expected uplink resource requirement, and receive, from the network, an uplink grant for the new band or the new uplink downlink configuration. The instructions for enhancing uplink throughput may include at least one of handover instructions to move to a new band or a radio resource control (RRC) reconfiguration indicating a new uplink-downlink configuration. Note that the new uplink-downlink configuration may include at least one of additional uplink slots or additional dynamic slots on a New Radio (NR) band as compared to a prior RRC configuration. Further, the uplink grant may be based, at least in part, on the indication of the expected uplink resource requirement. In some embodiments, the instructions may include one of a radio resource control reconfiguration message or a handover request message. Note that in some embodiments, the UE may receive the handover instructions when the UE is the only UE transmitting the BSR_Duration_Timer MACE CE to the base station. In addition, note that in some embodiments, the UE may receive the RRC reconfiguration message when the UE is one of multiple UEs transmitting the BSR_Duration_Timer MACE CE to the base station. In some embodiments, the indication of the expected uplink resource requirement may be transmitted via a medium access control (MAC) control element (CE). In some embodiments, the MAC CE may be a BSR_Duration_Timer MAC CE. In some embodiments, the MAC CE may include an expected buffer status report (BSR) duration field. In addition, the BSR duration field may be an indication a time period of the BSR. Further, the MAC CE may also include an uplink logical channel group (LCG) index (ID).

Figure 15:
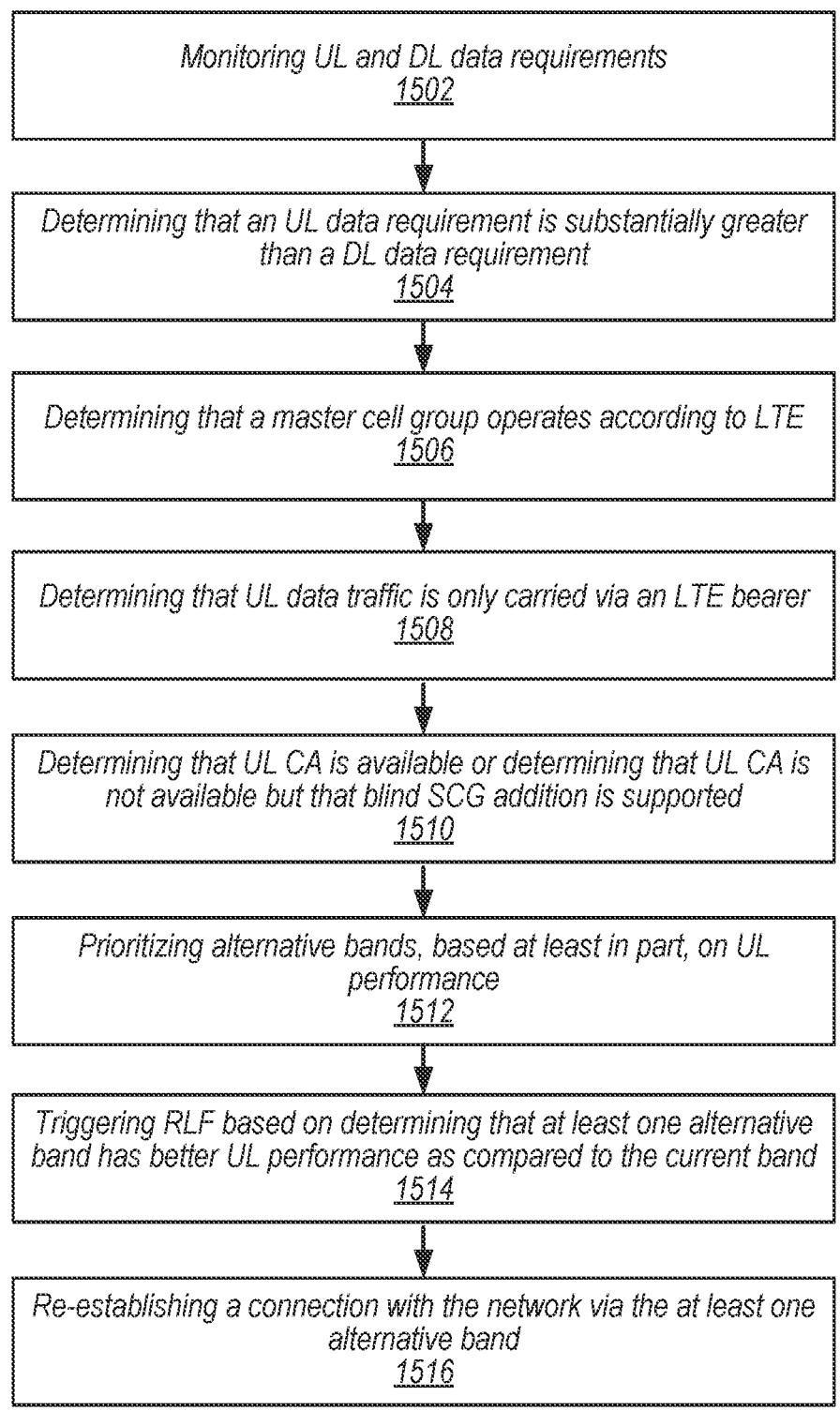

Turning to FIG. 15, at 1502, a UE, such as UE 106, may monitor uplink (UL) and downlink (DL) data requirements. In other words, the UE may monitor UL data requirements as compared to DL data requirements.

At 1504, the UE may determine, e.g., based on the monitoring, that an UL data requirement is substantially greater than a DL data requirement. In some instances, to determine that the UL data requirement is substantially greater that the DL data requirement, the UE may determine that, for a time period, the UL data requirement is greater than downlink data requirement by a predefined factor. In some embodiments, the time period may be at least ten seconds. In other embodiments, the time period may be another value, e.g., such as at least five seconds, at least twenty seconds, and/or some other value. In some embodiments, the predefined factor may be at least two. In other embodiments, the predefined factor may be at least one and a half (1.5) and/or some other value.

At 1506, the UE may determine that a master cell group operates according to LTE. In some embodiments, the UE may check radio resource control parameters. For example, the UE may check a radio resource control reconfiguration message during a secondary cell group addition procedure for a primaryPath and/or a cellGroup parameter to determine that the master cell group operates according to LTE.

At 1508, the UE may determine that UL data traffic is only carried via an LTE bearer. For example, the UE may check a value of an ul-DataSplitThreshold parameter to determine that the UL data traffic is only carried via the LTE bearer.

At 1510, the UE may determine that UL carrier aggregation is available or that carrier aggregation is not available but that blind secondary cell group addition is supported, e.g., by the network. In some embodiments, determining that UL carrier aggregation is available may include at least one of the UE, advertising an uplink carrier aggregation capability during radio resource control connection setup, triggering a test high uplink centric payload, and/or querying a local cell database.

At 1512, the UE may prioritize alternative bands, e.g., based at least in part, on UL performance. Note that the UE may identify alternative bands via a query of a network acquisition database.

At 1514, the UE may trigger a radio link failure, e.g., based, at least in part, on determining that at least one alternative band has better UL performance as compared to the current band.

At 1516, the UE may re-establish a connection with the network via the at least one alternative band.

In some embodiments, when the UE determines that the master cell group operates according to LTE and that UL data traffic is split between LTE bands and NR bands, the UE may compare UL performance for an LTE bearer and an NR bearer and modify, based on the comparison, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, the comparison of UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred.

In some embodiments, when the master cell group operates according to LTE and that UL data traffic is not split between LTE bands and NR bands, the UE may determine that uplink carrier aggregation is available, determine that there is not network support for blind secondary cell group addition, artificially fail a current secondary cell group, and use uplink carrier aggregation on the master cell group. In some embodiments, determining that UL carrier aggregation is available may include at least one of the UE, advertising an uplink carrier aggregation capability during radio resource control connection setup, triggering a test high uplink centric payload, and/or querying a local cell database. In some embodiments, artificially failing the current secondary cell group may include at least one of the UE reporting a secondary cell group 0, the UE reporting the secondary cell group failure via layer 3 signaling, and/or the reporting the secondary cell group failure via radio resource control signaling. Further, in some embodiments, when the one or more conditions include the UE determining that the master cell group operates according to LTE and that UL data traffic is split between LTE bands and NR bands, the at least one UL enhancement procedure may include the UE comparing UL performance for an LTE bearer and an NR bearer and modifying, based on the comparing, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred.

In some embodiments, when the UE determines that the master cell group does not operate according to LTE, the UE may determine that UL traffic is carried via the split bearer, compare UL performance for an LTE bearer and an NR bearer, and modify, based on the comparing, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred. Additionally, in some embodiments, when the UE determines that UL traffic is not carried via the split bearer, the UE may identify alternative bands via a query of a network acquisition database, prioritize the alternative bands e.g., based at least in part, on UL performance, determine that at least one alternative band has better UL performance as compared to the current band, trigger a radio link failure, and re-establish a connection with the network via the at least one alternative band.

In some embodiments, the UE may transmit, to a base station, an indication of an expected uplink resource requirement, receive, from the base station and based, at least in part, on the indication of the expected uplink resource requirement, instructions for enhancing uplink throughput, transition to a new band or a new uplink-downlink configuration based on the instructions for enhancing uplink throughput, re-transmit, to the base station, the indication of the expected uplink resource requirement, and receive, from the network, an uplink grant for the new band or the new uplink downlink configuration. The instructions for enhancing uplink throughput may include at least one of handover instructions to move to a new band or a radio resource control (RRC) reconfiguration indicating a new uplink-downlink configuration. Note that the new uplink-downlink configuration may include at least one of additional uplink slots or additional dynamic slots on a New Radio (NR) band as compared to a prior RRC configuration. Further, the uplink grant may be based, at least in part, on the indication of the expected uplink resource requirement. In some embodiments, the instructions may include one of a radio resource control reconfiguration message or a handover request message. Note that in some embodiments, the UE may receive the handover instructions when the UE is the only UE transmitting the BSR_Duration_Timer MACE CE to the base station. In addition, note that in some embodiments, the UE may receive the RRC reconfiguration message when the UE is one of multiple UEs transmitting the BSR_Duration_Timer MACE CE to the base station. In some embodiments, the indication of the expected uplink resource requirement may be transmitted via a medium access control (MAC) control element (CE). In some embodiments, the MAC CE may be a BSR_Duration_Timer MAC CE. In some embodiments, the MAC CE may include an expected buffer status report (BSR) duration field. In addition, the BSR duration field may be an indication a time period of the BSR. Further, the MAC CE may also include an uplink logical channel group (LCG) index (ID).

Figure 16:
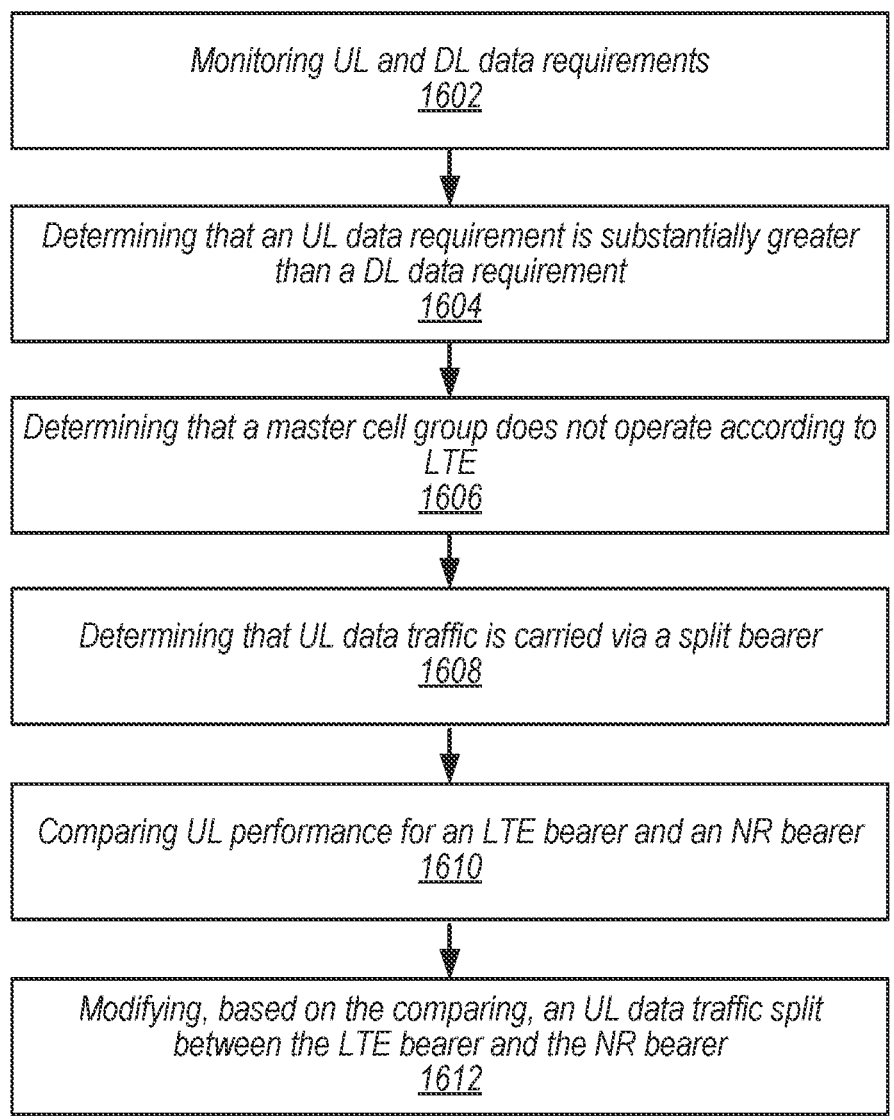

Turning to FIG. 16, at 1602, a UE, such as UE 106, may monitor uplink (UL) and downlink (DL) data requirements. In other words, the UE may monitor UL data requirements as compared to DL data requirements.

At 1604, the UE may determine, e.g., based on the monitoring, that an UL data requirement is substantially greater than a DL data requirement. In some instances, to determine that the UL data requirement is substantially greater than the DL data requirement, the UE may determine that, for a time period, the UL data requirement is greater than downlink data requirement by a predefined factor. In some embodiments, the time period may be at least ten seconds. In other embodiments, the time period may be another value, e.g., such as at least five seconds, at least twenty seconds, and/or some other value. In some embodiments, the predefined factor may be at least two. In other embodiments, the predefined factor may be at least one and a half (1.5) and/or some other value.

At 1606, the UE may determine that a master cell group operates according to LTE. In some embodiments, the UE may check radio resource control parameters. For example, the UE may check a radio resource control reconfiguration message during a secondary cell group addition procedure for a primaryPath and/or a cellGroup parameter to determine that the master cell group operates according to LTE.

At 1608, the UE may determine that UL data traffic is carried via a split bearer between LTE and NR. For example, the UE may check a value of an ul-DataSplitThreshold parameter to determine that the UL data traffic is carried via a split bearer between LTE and NR.

At 1610, the UE may compare UL performance for an LTE bearer and an NR bearer.

At 1612, the UE may modify, based on the comparison, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred.

Additionally, in some embodiments, when the UE determines that UL traffic is not carried via the split bearer, the UE may identify alternative bands via a query of a network acquisition database, prioritize the alternative bands e.g., based at least in part, on UL performance, determine that at least one alternative band has better UL performance as compared to the current band, trigger a radio link failure, and re-establish a connection with the network via the at least one alternative band.

In some embodiments, when the UE determines that the master cell group operates according to LTE and that UL data traffic is split between LTE bands and NR bands, the UE may compare UL performance for an LTE bearer and an NR bearer and modify, based on the comparison, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, the comparison of UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred.

In some embodiments, when the master cell group operates according to LTE and that UL data traffic is not split between LTE bands and NR bands, the UE may determine that uplink carrier aggregation is available, determine that there is not network support for blind secondary cell group addition, artificially fail a current secondary cell group, and use uplink carrier aggregation on the master cell group. In some embodiments, determining that UL carrier aggregation is available may include at least one of the UE, advertising an uplink carrier aggregation capability during radio resource control connection setup, triggering a test high uplink centric payload, and/or querying a local cell database. In some embodiments, artificially failing the current secondary cell group may include at least one of the UE reporting a secondary cell group 0, the UE reporting the secondary cell group failure via layer 3 signaling, and/or the reporting the secondary cell group failure via radio resource control signaling. Further, in some embodiments, when the one or more conditions include the UE determining that the master cell group operates according to LTE and that UL data traffic is split between LTE bands and NR bands, the at least one UL enhancement procedure may include the UE comparing UL performance for an LTE bearer and an NR bearer and modifying, based on the comparing, an UL data traffic split between the LTE bearer and the NR bearer. Note that when the UL performance for the LTE bearer is better than the UL performance for the NR bearer, the LTE bearer may be preferred over the NR bearer. Note further that when the UL performance for the NR bearer is better than the UL performance for the LTE bearer, the NR bearer may be preferred over the LTE bearer. In some embodiments, the UL performance may be based, at least in part, on one or more of UL channel bandwidth, UL block error rate, and/or UL pathloss. Further, comparing UL performance for the LTE bearer and the NR bearer may include the UE determining a first UL performance level index for the LTE bearer and a second UL performance level index for the NR bearer and determining a scale factor, e.g., based, at least in part, on the first UL performance level index and the second UL performance level index. In such embodiments, the UL data traffic split between the LTE bearer and the NR bearer may be based on the scale factor. In addition, when the scale factor is greater than zero, the LTE bearer may be preferred and when the scale factor is zero or less, the NR bearer may be preferred.

In some embodiments, when the UE determines that the master cell group operates according to LTE, that UL data traffic is only carried via LTE bands, and that UL carrier aggregation is available or that UL carrier aggregation is not available but that blind secondary cell group addition is supported by the network, the UE may identify alternative bands via a query of a network acquisition database, prioritize alternative bands, e.g., based at least in part, on UL performance, determine that at least one alternative band has better UL performance as compared to the current band, trigger a radio link failure, and re-establish a connection with the network via the at least one alternative band.

In some embodiments, the UE may transmit, to a base station, an indication of an expected uplink resource requirement, receive, from the base station and based, at least in part, on the indication of the expected uplink resource requirement, instructions for enhancing uplink throughput, transition to a new band or a new uplink-downlink configuration based on the instructions for enhancing uplink throughput, re-transmit, to the base station, the indication of the expected uplink resource requirement, and receive, from the network, an uplink grant for the new band or the new uplink downlink configuration. The instructions for enhancing uplink throughput may include at least one of handover instructions to move to a new band or a radio resource control (RRC) reconfiguration indicating a new uplink-downlink configuration. Note that the new uplink-downlink configuration may include at least one of additional uplink slots or additional dynamic slots on a New Radio (NR) band as compared to a prior RRC configuration. Further, the uplink grant may be based, at least in part, on the indication of the expected uplink resource requirement. In some embodiments, the instructions may include one of a radio resource control reconfiguration message or a handover request message. Note that in some embodiments, the UE may receive the handover instructions when the UE is the only UE transmitting the BSR_Duration_Timer MACE CE to the base station. In addition, note that in some embodiments, the UE may receive the RRC reconfiguration message when the UE is one of multiple UEs transmitting the BSR_Duration_Timer MACE CE to the base station. In some embodiments, the indication of the expected uplink resource requirement may be transmitted via a medium access control (MAC) control element (CE). In some embodiments, the MAC CE may be a BSR_Duration_Timer MAC CE. In some embodiments, the MAC CE may include an expected buffer status report (BSR) duration field. In addition, the BSR duration field may be an indication a time period of the BSR. Further, the MAC CE may also include an uplink logical channel group (LCG) index (ID).

Figure 17:
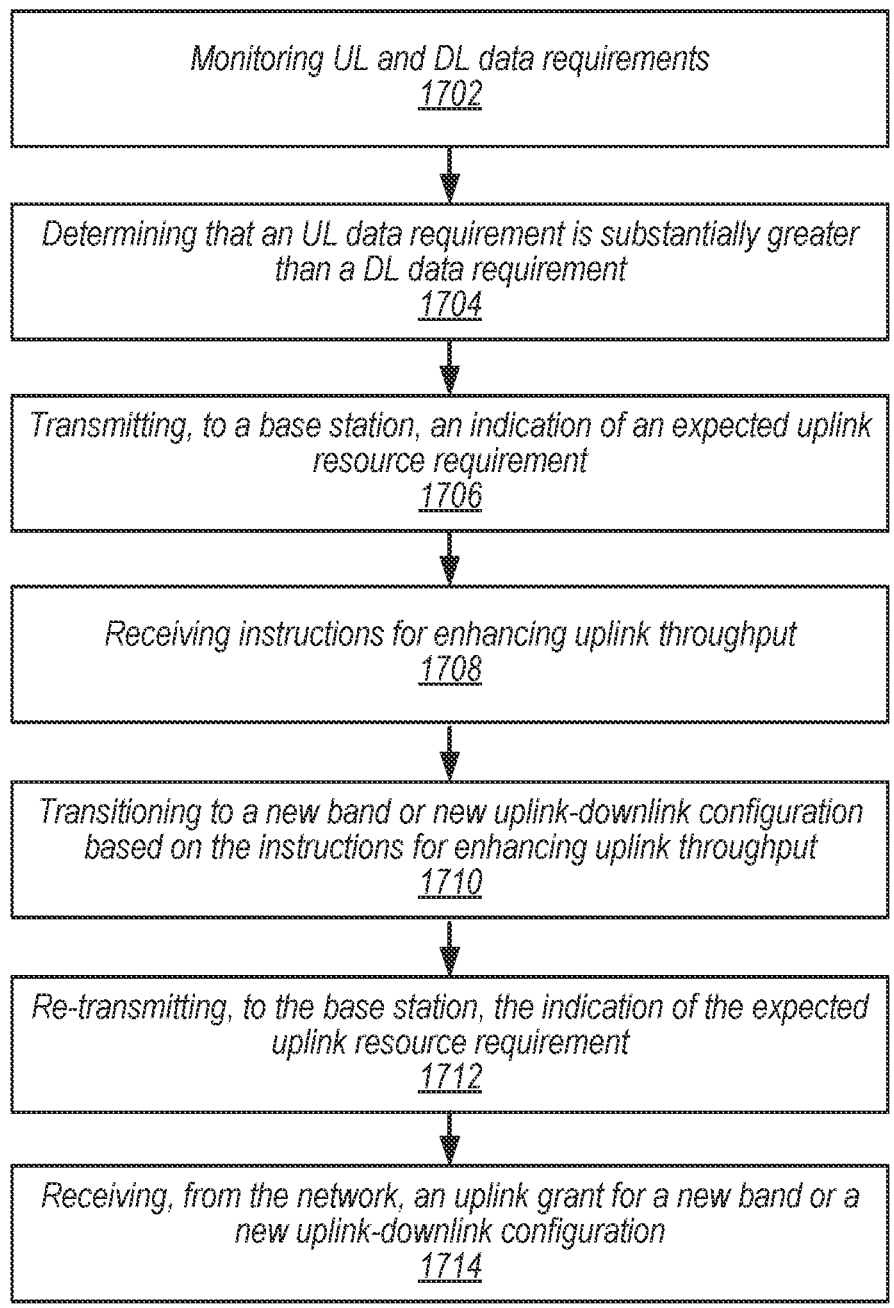

Turning to FIG. 17, at 1702, a UE, such as UE 106, may monitor uplink (UL) and downlink (DL) data requirements. In other words, the UE may monitor UL data requirements as compared to DL data requirements.

At 1704, the UE may determine, e.g., based on the monitoring, that an UL data requirement is substantially greater than a DL data requirement. In some instances, to determine that the UL data requirement is substantially greater that the DL data requirement, the UE may determine that, for a time period, the UL data requirement is greater than downlink data requirement by a predefined factor. In some embodiments, the time period may be at least ten seconds. In other embodiments, the time period may be another value, e.g., such as at least five seconds, at least twenty seconds, and/or some other value. In some embodiments, the predefined factor may be at least two. In other embodiments, the predefined factor may be at least one and a half (1.5) and/or some other value.

At 1706, the UE may transmit, to a base station, an indication of an expected uplink resource requirement. In some embodiments, the indication of the expected uplink resource requirement may be transmitted via a medium access control (MAC) control element (CE). In some embodiments, the MAC CE may be a BSR_Duration_Timer MAC CE. In some embodiments, the MAC CE may include an expected buffer status report (BSR) duration field. In addition, the BSR duration field may be an indication a time period of the BSR. Further, the MAC CE may also include an uplink logical channel group (LCG) index (ID).

At 1708, the UE may receive, from the base station and based, at least in part, on the indication of the expected uplink resource requirement, instructions for enhancing uplink throughput. The instructions for enhancing uplink throughput may include at least one of handover instructions to move to a new band or a radio resource control (RRC) reconfiguration indicating a new uplink-downlink configuration. Note that the new uplink-downlink configuration may include at least one of additional uplink slots or additional dynamic slots on a New Radio (NR) band as compared to a prior RRC configuration. In some embodiments, the instructions may include one of a radio resource control reconfiguration message or a handover request message. Note that in some embodiments, the UE may receive the handover instructions when the UE is the only UE transmitting the BSR_Duration_Timer MACE CE to the base station. In addition, note that in some embodiments, the UE may receive the RRC reconfiguration message when the UE is one of multiple UEs transmitting the BSR_Duration_Timer MACE CE to the base station.

At 1710, the UE may transition to the new band or the new uplink-downlink configuration based on the instructions for enhancing uplink throughput, e.g., via a handover procedure or a radio resource control re-configuration procedure.

At 1712, the UE may re-transmit, to the base station, the indication of the expected uplink resource requirement. In some embodiments, the indication of the expected uplink resource requirement may be transmitted via a medium access control (MAC) control element (CE). In some embodiments, the MAC CE may be a BSR_Duration_Timer MAC CE. In some embodiments, the MAC CE may include an expected buffer status report (BSR) duration field. In addition, the BSR duration field may be an indication a time period of the BSR. Further, the MAC CE may also include an uplink logical channel group (LCG) index (ID).

At 1714, the UE may receive, from the network, an uplink grant for either the new band or based on the new uplink-downlink configuration. The uplink grant may be based, at least in part, on the indication of the expected uplink resource requirement.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform communications;
wherein the one or more processors are configured to cause the UE to:
monitor uplink (UL) and downlink (DL) data requirements;
determine, based on the monitoring, that an UL data requirement is substantially greater than a DL data requirement, including determining that, for a time period of at least ten seconds, the UL data requirement is greater than the DL data requirement by a predefined factor that is greater than two;
determine, based on one or more UL enhancement conditions, to perform at least one UL enhancement procedure; and
perform the at least one UL enhancement procedure.

2. The UE of claim 1,
wherein the one or more processors are further configured to cause the UE to:
determine, based on the monitoring, that the UL data requirement is not substantially greater than the DL data requirement;
in response to determining that an anchor band does not support dual connectivity, trigger a radio link failure; and
re-establish a connection via a band that supports dual connectivity.

3. The UE of claim 2,
wherein the one or more processors are further configured to cause the UE to:
query a network acquisition database to determine bands that support dual connectivity;
prioritize bands that support dual connectivity; and
select the band based on the prioritizing.

4. The UE of claim 1,
wherein the one or more UL enhancement conditions include at least one of:
the UE determining that a master cell group operates according to Long Term Evolution (LTE) or that the master cell group does not operate according to LTE;
the UE determining that UL data traffic is only carried via LTE bands or that UL data traffic is split between LTE bands and New Radio (NR) bands;
the UE determining that UL carrier aggregation is available or that UL carrier aggregation is not available; or
the UE determining that blind secondary cell group addition is supported by a network or that blind secondary cell group addition is not supported by the network.

5. The UE of claim 1,
wherein to perform the at least one UL enhancement procedure when the one or more conditions include determining that a master cell group does not operate according to LTE, the one or more processors are further configured to cause the UE to:

determine whether UL data traffic is carried via a split bearer between LTE and NR; and
in response to determining that UL traffic is carried via the split bearer:
compare UL performance for an LTE bearer and an NR bearer; and
modify, based on the comparison, an UL data traffic split between the LTE bearer and the NR bearer, wherein when the UL performance for the LTE bearer is better than the UL performance for the NR bearer, the LTE bearer is preferred over the NR bearer, and wherein when the UL performance for the NR bearer is better than the UL performance for the LTE bearer, the NR bearer is preferred over the LTE bearer.

6. The UE of claim 1,
wherein to perform the at least one UL enhancement procedure when the one or more conditions include determining that a master cell group operates according to LTE and that UL data traffic is not split between LTE bands and NR bands, the one or more processors are further configured to cause the UE to:
determine whether UL carrier aggregation is available;
in response to determining that UL carrier aggregation is available, determine whether there is network support for blind secondary cell group addition;
in response to determining that there is not network support for blind secondary cell group addition, artificially fail a current secondary cell group; and
use uplink carrier aggregation on the master cell group.

7. The UE of claim 1,
wherein to perform the at least one UL enhancement procedure when the one or more conditions include determining that a master cell group operates according to LTE, determining that UL data traffic is only carried via LTE bands, and determining that UL carrier aggregation is available or determining that UL carrier aggregation is not available but that blind secondary cell group addition is supported, the one or more processors are further configured to cause the UE to:
identify alternative bands via a query of a network acquisition database;
prioritize alternative bands, based at least in part, on UL performance;
determine whether at least one alternative band has better UL performance as compared to a current band;
in response to determining that at least one alternative band has better UL performance as compared to the current band, trigger a radio link failure; and
re-establish a connection with the network via the at least one alternative band.

8. The UE of claim 1,
wherein, to perform at least one UL enhancement procedure, the one or more processors are further configured to cause the UE to:
transmit, to a base station, an indication of an expected uplink resource requirement;
receive, from the base station and based, at least in part, on the indication of the expected uplink resource requirement, instructions for enhancing uplink throughput, wherein the instructions include at least one of handover instructions to move to a new band or a radio resource control (RRC) reconfiguration indicating a new uplink-downlink configuration, wherein the new uplink-downlink configuration includes at least one of additional uplink slots or additional dynamic slots on a New Radio (NR) band as compared to a prior RRC configuration;
transition to the new band or new uplink-downlink configuration;
re-transmit, to the base station, the indication of the expected uplink resource requirement; and
receive, from the base station, an uplink grant for either the new band or based on the new uplink-downlink configuration, wherein the uplink grant is based, at least in part, on the indication of the expected uplink resource requirement.

9. A non-transitory computer readable memory medium storing program instructions executable by processing circuitry to cause a user equipment device (UE) to:
monitor uplink (UL) and downlink (DL) data requirements;
determine, based on the monitoring, that an UL data requirement is substantially greater than a DL data requirement;
transmit, to a base station, an indication of an expected uplink resource requirement;
receive, from the base station and based, at least in part, on the indication of the expected uplink resource requirement, instructions for enhancing uplink throughput, wherein the instructions include at least one of handover instructions to move to a new band or a radio resource control (RRC) reconfiguration indicating a new uplink-downlink configuration, wherein the new uplink-downlink configuration includes at least one of additional uplink slots or additional dynamic slots on a New Radio (NR) band as compared to a prior RRC configuration;
transition to a new band or new uplink-downlink configuration based on the instructions for enhancing uplink throughput;
re-transmit, to the base station, the indication of the expected uplink resource requirement; and
receive, from the base station, an uplink grant for either the new band or based on the new uplink-downlink configuration, wherein the uplink grant is based, at least in part, on the indication of the expected uplink resource requirement.

10. The non-transitory computer readable memory medium of claim 9,
wherein the instructions for enhancing uplink throughput include at least one of:
instructions to handover to a new band; or
a radio resource control (RRC) reconfiguration indicating a new uplink-downlink configuration, wherein the new uplink-downlink configuration includes at least one of additional uplink slots or additional dynamic slots on a New Radio (NR) band as compared to a prior RRC configuration.

11. The non-transitory computer readable memory medium of claim 9,
wherein the instructions for enhancing uplink throughput include one of a radio resource control reconfiguration message or a handover request message.

12. The non-transitory computer readable memory medium of claim 9,
wherein the indication of the expected uplink resource requirement is transmitted via a medium access control (MAC) control element (CE).

13. The non-transitory computer readable memory medium of claim 12,
wherein the MAC CE is a BSR_Duration_Timer MAC CE; wherein the MAC CE includes an expected buffer status report (BSR) duration field, wherein the BSR duration field is an indication of a time period of the BSR, and wherein the MAC CE further includes an uplink logical channel group (LCG) index (ID).

14. An apparatus, comprising:
a memory; and
a processor in communication with the memory, wherein the processor is configured to:
- monitor uplink (UL) and downlink (DL) data requirements;
- determine, based on the monitoring, that an UL data requirement is substantially greater than a DL data requirement;
- determine, based on one or more UL enhancement conditions, to perform at least one UL enhancement procedure, including determining that, for a time period of at least ten seconds, the UL data requirement is greater than the DL data requirement by a predefined factor that is greater than two; and
- perform the at least one UL enhancement procedure.

15. The apparatus of claim 14,
wherein the processor is further configured to:
- determine, based on the monitoring, that the UL data requirement is not substantially greater than the DL data requirement;
- in response to determining that an anchor band does not support dual connectivity, trigger a radio link failure; and
- re-establish a connection via a band that supports dual connectivity.

16. The apparatus of claim 15,
wherein to determine whether the anchor band supports dual connectivity, the processor is further configured to query a network acquisition database to determine the anchor band's dual connectivity capability, and wherein the network acquisition database is crowd-sourced.

17. The apparatus of claim 15,
wherein the processor is further configured to:
- query a network acquisition database to determine bands that support dual connectivity;
- prioritize bands that support dual connectivity; and
- select the band based on the prioritizing.

18. The apparatus of claim 14,
wherein the one or more UL enhancement conditions include at least one of:
- determining that a master cell group operates according to Long Term Evolution (LTE) or that the master cell group does not operate according to LTE;
- determining that UL data traffic is only carried via LTE bands or that UL data traffic is split between LTE bands and New Radio (NR) bands;
- determining that UL carrier aggregation is available or that UL carrier aggregation is not available; or
- determining that blind secondary cell group addition is supported by a network or that blind secondary cell group addition is not supported by the network.

19. The apparatus of claim 14,
wherein, to perform the at least one UL enhancement procedure when the one or more conditions include determining that a master cell group does not operate according to LTE, the processor is further configured to:
- determine whether UL data traffic is carried via a split bearer between LTE and NR.

20. The apparatus of claim 19,
wherein the processor is further configured to:
- in response to determining that UL traffic is carried via the split bearer:
  - compare UL performance for an LTE bearer and an NR bearer; and
  - modify, based on the comparison, an UL data traffic split between the LTE bearer and the NR bearer, wherein when the UL performance for the LTE bearer is better than the UL performance for the NR bearer, the LTE bearer is preferred over the NR bearer, and wherein when the UL performance for the NR bearer is better than the UL performance for the LTE bearer, the NR bearer is preferred over the LTE bearer.

* * * * *